(12) United States Patent
Tanuki et al.

(10) Patent No.: US 9,457,719 B2
(45) Date of Patent: Oct. 4, 2016

(54) WORK VEHICLE PERIPHERY MONITORING SYSTEM AND WORK VEHICLE

(71) Applicant: Komatsu Ltd., Tokyo (JP)

(72) Inventors: Tomikazu Tanuki, Fujisawa (JP); Dai Tsubone, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/825,189

(22) PCT Filed: Oct. 19, 2012

(86) PCT No.: PCT/JP2012/077057
§ 371 (c)(1),
(2) Date: Mar. 20, 2013

(87) PCT Pub. No.: WO2014/045456
PCT Pub. Date: Mar. 27, 2014

(65) Prior Publication Data
US 2015/0217691 A1 Aug. 6, 2015

(30) Foreign Application Priority Data
Sep. 21, 2012 (JP) ................... 2012-208552

(51) Int. Cl.
*H04N 7/18* (2006.01)
*B60R 1/00* (2006.01)
(Continued)

(52) U.S. Cl.
CPC ............... *B60R 1/00* (2013.01); *E02F 9/261* (2013.01); *G06K 9/00805* (2013.01); *H04N 7/18* (2013.01); *H04N 7/181* (2013.01); *B60R 2300/301* (2013.01); *B60R 2300/70* (2013.01)

(58) Field of Classification Search
CPC ........................................................ H04N 7/181
USPC ........................................................ 348/148
See application file for complete search history.

(56) References Cited

U.S. PATENT DOCUMENTS

2005/0151845 A1 7/2005 Tsukada et al.
2006/0274147 A1 12/2006 Chinomi et al.
(Continued)

FOREIGN PATENT DOCUMENTS

CN 101676152 A 3/2010
JP 2005-020502 A 1/2005
(Continued)

OTHER PUBLICATIONS

Office Action dated Oct. 21, 2013, issued for the corresponding Australian patent application No. 2012372155.
(Continued)

*Primary Examiner* — Tung Vo
*Assistant Examiner* — Rowina Cattungal
(74) *Attorney, Agent, or Firm* — Locke Lord LLP

(57) ABSTRACT

A work vehicle periphery monitoring system includes a plurality of imaging apparatuses which are attached to the work vehicle and image the periphery of a work vehicle to output image information, a display control unit which displays an image based on image information which is output from imaging apparatuses, and a pattern indicating information relating to the work vehicle periphery monitoring system on a monitor, and a pattern display control unit which changes a display position at which the pattern is displayed on the monitor 50 based on a display switching signal for switching a display of the monitor, before and after switching the display of the monitor.

20 Claims, 17 Drawing Sheets

(51) Int. Cl.
*E02F 9/26* (2006.01)
*G06K 9/00* (2006.01)

(56) References Cited

U.S. PATENT DOCUMENTS

| 2010/0066518 | A1 | 3/2010 | Ohshima et al. | |
|---|---|---|---|---|
| 2012/0229645 | A1* | 9/2012 | Yamada | 348/148 |
| 2012/0257058 | A1* | 10/2012 | Kinoshita et al. | 348/148 |

FOREIGN PATENT DOCUMENTS

| JP | 2005-163370 A | 6/2005 |
|---|---|---|
| JP | 2006-341641 A | 12/2006 |
| JP | 2008-034964 A | 2/2008 |
| JP | 2008-163719 A | 7/2008 |
| JP | 2010-147516 A | 7/2010 |
| JP | 2011-251681 A | 12/2011 |
| JP | 2012-054664 A | 3/2012 |
| JP | 2012-066700 A | 4/2012 |

OTHER PUBLICATIONS

International Search Report dated Jan. 15, 2013, issued for PCT/JP2012/077057.

Written Opinion mailed Jan. 15, 2013, issued for PCT/JP2012/077057.

* cited by examiner

FIG.11
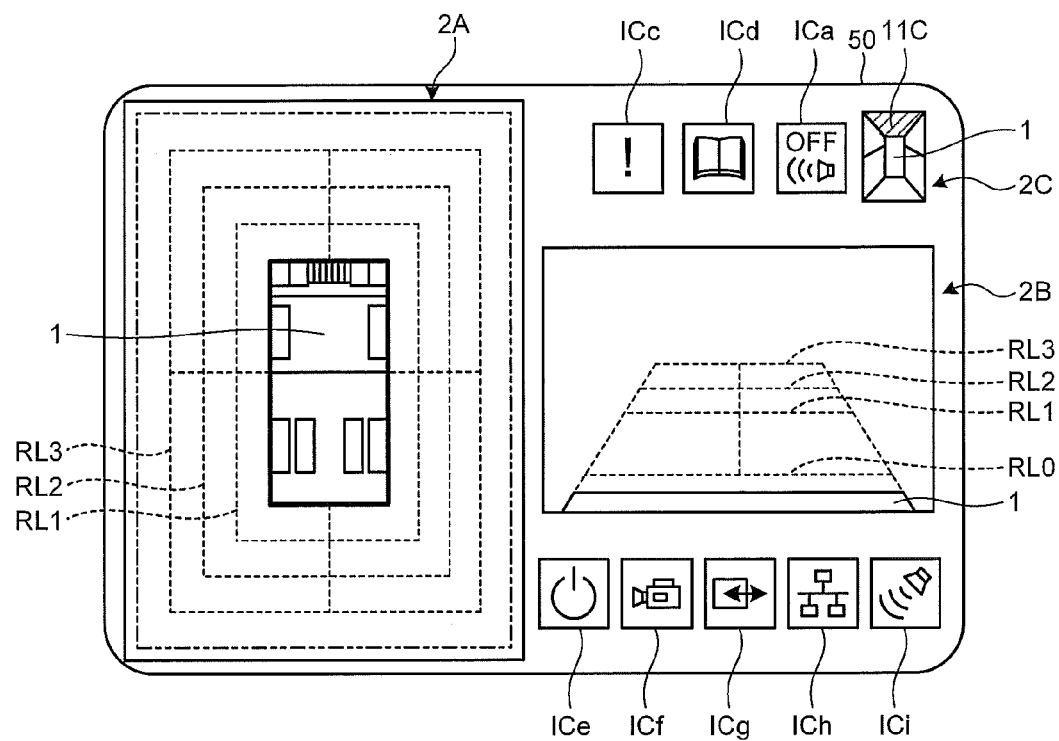
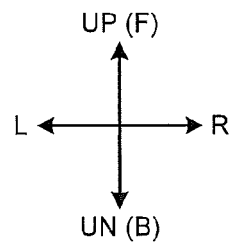

FIG.17
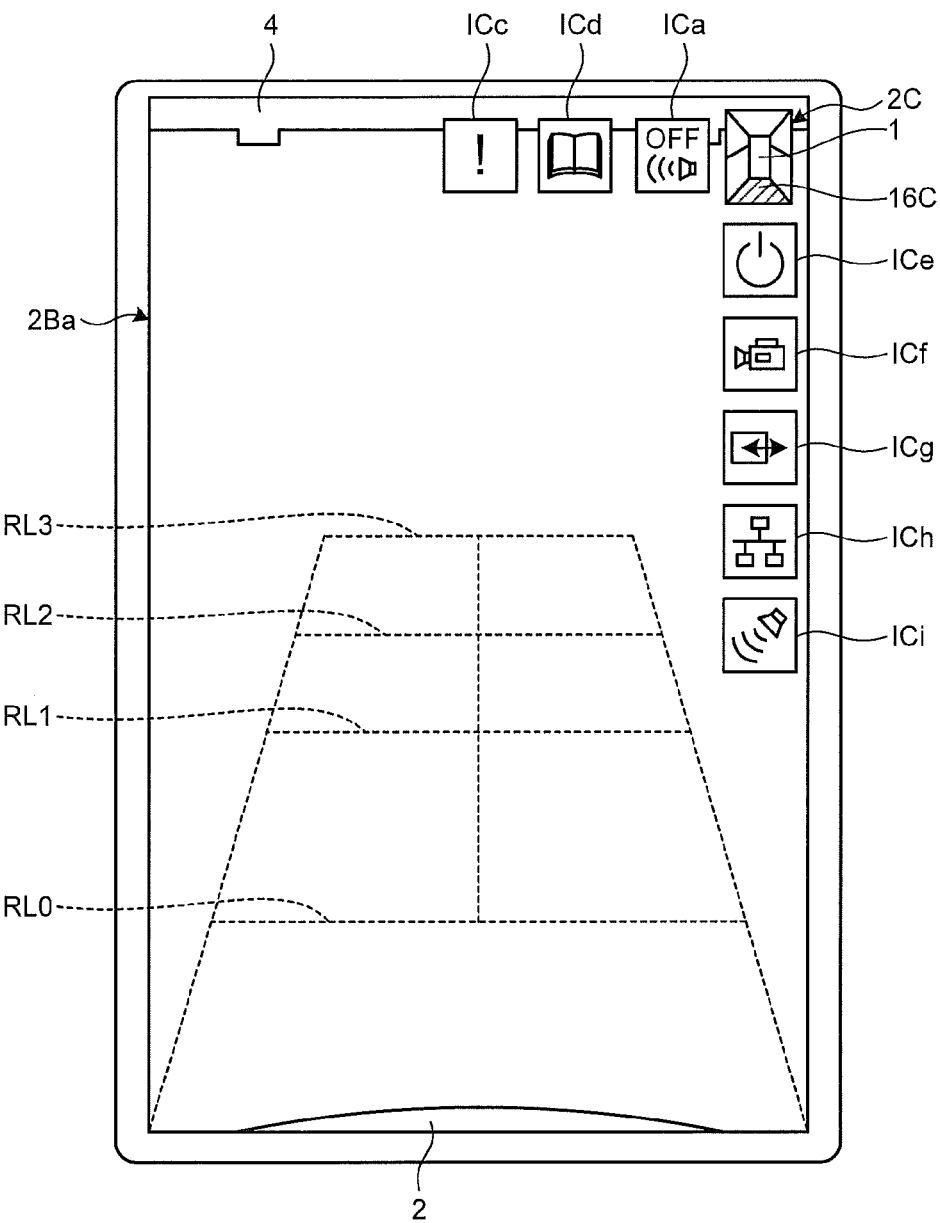
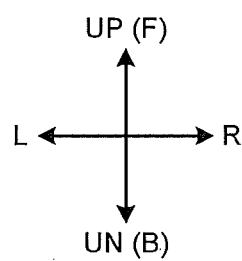

WORK VEHICLE PERIPHERY MONITORING SYSTEM AND WORK VEHICLE

FIELD

The present invention relates to a technology for monitoring a periphery of a work vehicle.

BACKGROUND

In a civil engineering work site, or a quarrying site of a mine, various work vehicles such as a dump truck, a hydraulic excavator, and the like are used. In particular, in a mine, a supersized work vehicle is used. Since such a work vehicle has a remarkably wider vehicle width, higher vehicle height, and larger overall length than a general vehicle, so it is difficult for an operator to confirm the periphery and get a grasp of the situation using side mirrors and the like. For this reason, as a technology which enables an operator to easily grasp the situation periphery of a vehicle, and supports driving of the vehicle, an apparatus which monitors the periphery of a vehicle has been proposed. As such an apparatus which monitors the periphery of a vehicle, for example, there is an apparatus which images periphery of a vehicle using a camera, or the like, which is attached to a vehicle, and simultaneously displays a bird's eye image which is created by compositing an obtained image, and a direct image which is imaged using the camera or the like (for example, Patent Literature 1).

CITATION LIST

Patent Literature

Patent Literature 1: Japanese Patent Application Laid-open No. 2011-251681

SUMMARY

Technical Problem

Meanwhile, as an apparatus which monitors the periphery, there is an apparatus which enables an operator of a work vehicle to recognize various information by displaying information on a monitor or the like which is installed in a driver's cab by encoding the information using patterns. The above described patterns are displayed on a display unit such as a monitor or the like, along with a bird's eye image, or an image which is imaged using an imaging apparatus such as a camera. When the patterns indicating the information, and an image other than these are simultaneously displayed on the display unit, in a case in which an image other than the patterns indicating information among images which are displayed on the display unit is switched to another image, there is a possibility that a portion to which an operator should pay attention is present, in which the portion is a portion in which an image after being switched by a pattern indicating information is hidden. As a result, there is a possibility that an operator is not able to sufficiently confirm a portion to be paid attention to.

An object of the present invention is to make an operator easily confirm a portion to be paid attention to when an image other than patterns indicating information is switched to another image, in a case in which a pattern indicating information and an image other than the pattern are simultaneously displayed on a display unit.

Solution to Problem

According to the present invention, a work vehicle periphery monitoring system which monitors a periphery of a work vehicle, comprises: an imaging apparatus which is attached to the work vehicle and images a periphery of the work vehicle to output image information; a display control unit which displays an image based on the image information which is output by the imaging apparatus, and a pattern indicating information relating to the work vehicle periphery monitoring system on a display unit; and a pattern display control unit which, when a display of the display unit is switched, changes a display position of the pattern which is displayed on the display unit after the display of the display unit is switched.

In the present invention, it is preferable that when the display of the display unit is switched to an image which is imaged by the imaging apparatus, the pattern display control unit changes the display position after the display of the display unit is switched to a position corresponding to an upper side, or a side of the work vehicle which is displayed in the image which is imaged by the imaging apparatus.

In the present invention, it is preferable that when a plurality of the patterns are present, the display position is determined based on a degree of importance of the information corresponding to the plurality of patterns.

In the present invention, it is preferable that the pattern display control unit maintains the display position of the pattern indicating the information which is highly important, before and after the display of the display unit is switched.

In the present invention, it is preferable that in the display position, the degree of importance becomes higher in order of proximity to a driver's seat of the work vehicle.

In the present invention, it is preferable that the pattern display control unit changes the display position of the pattern after the display of the display unit is switched to a position which is far from the driver's seat of the work vehicle in the display unit.

In the present invention, it is preferable that the display of the display unit is switched based on a signal which is generated by a display switching unit which receives an input for switching the display of the display unit, or a signal indicating a state of the work vehicle.

In the present invention, it is preferable that the display control unit displays, on the display unit, a pattern indicating an imaging direction of the imaging apparatus as the pattern, with the image which is imaged by the imaging apparatus, and wherein the pattern display control unit maintains a position at which the pattern indicating the imaging direction of the imaging apparatus is displayed on the display unit, before and after the display of the display unit is switched.

According to the present invention, a work vehicle periphery monitoring system which monitors a periphery of a work vehicle, comprises: a plurality of imaging apparatuses which are attached to the work vehicle and image a periphery of the work vehicle to output image information; a display control unit which displays an image based on the image information which is output by the imaging apparatus, and a pattern indicating information relating to the work vehicle periphery monitoring system on a display unit; and a pattern display control unit which changes a display position of the pattern which is displayed on the display unit after a display of the display unit is switched based on a display switching signal for switching the display of the display unit, wherein, when the display of the display unit is switched to an independent display in which an image which is imaged by the imaging apparatus is independently displayed, the pattern display control unit changes the display position after the display of the display unit is switched to a position corresponding to an upper side or a side of the work vehicle which is displayed in the image which is imaged by the imaging apparatus.

According to the present invention, a work vehicle comprises: the work vehicle periphery monitoring system.

According to the present invention, it is possible to make a portion to be paid attention to by an operator be easily confirmed when an image other than a pattern indicating information is switched to another image in a case in which the pattern indicating information, and an image other than the pattern are simultaneously displayed on a display unit.

BRIEF DESCRIPTION OF DRAWINGS

FIG. 11 is a diagram which illustrates the monitor 50 on which the first image 2A and the second image 2B are displayed when a malfunction occurs in the periphery monitoring system 10.

FIG. 17 is a diagram which illustrates another example of the monitor 50 on which only the second image 2B is displayed when a malfunction occurs in the periphery monitoring system 10.

DESCRIPTION OF EMBODIMENTS

Embodiments for embodying the present invention (embodiment) will be described in detail while referring to drawings. In descriptions below, the front, the rear, the left, and the right are terms based on an operator who sits in a driver's seat. For example, the front is the line of sight direction of the operator who sits in the driver's seat, and is the side which faces a steering wheel which is operated by the operator from the driver's seat. The rear is the opposite side to the front, and the side which faces the driver's seat from the steering wheel. The vehicle width direction of the work vehicle is the same as the lateral direction of the work vehicle. According to the embodiment, the operator also includes a person who performs maintenance and checking of a work vehicle, in addition to a person who drives the work vehicle.

<Work Vehicle>

Figure 1:
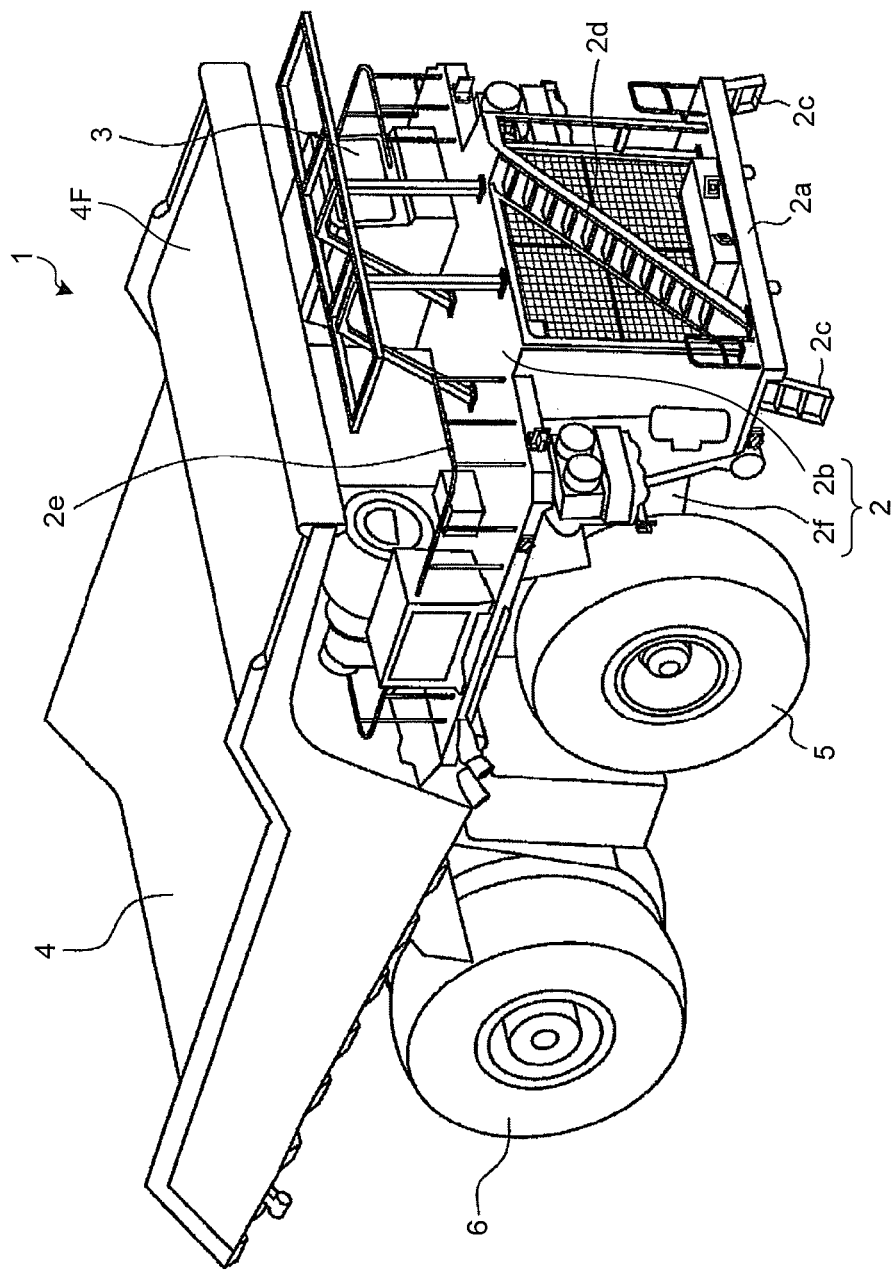
FIG. 1 is a perspective view which illustrates a work vehicle according to an embodiment.
Figure 2:
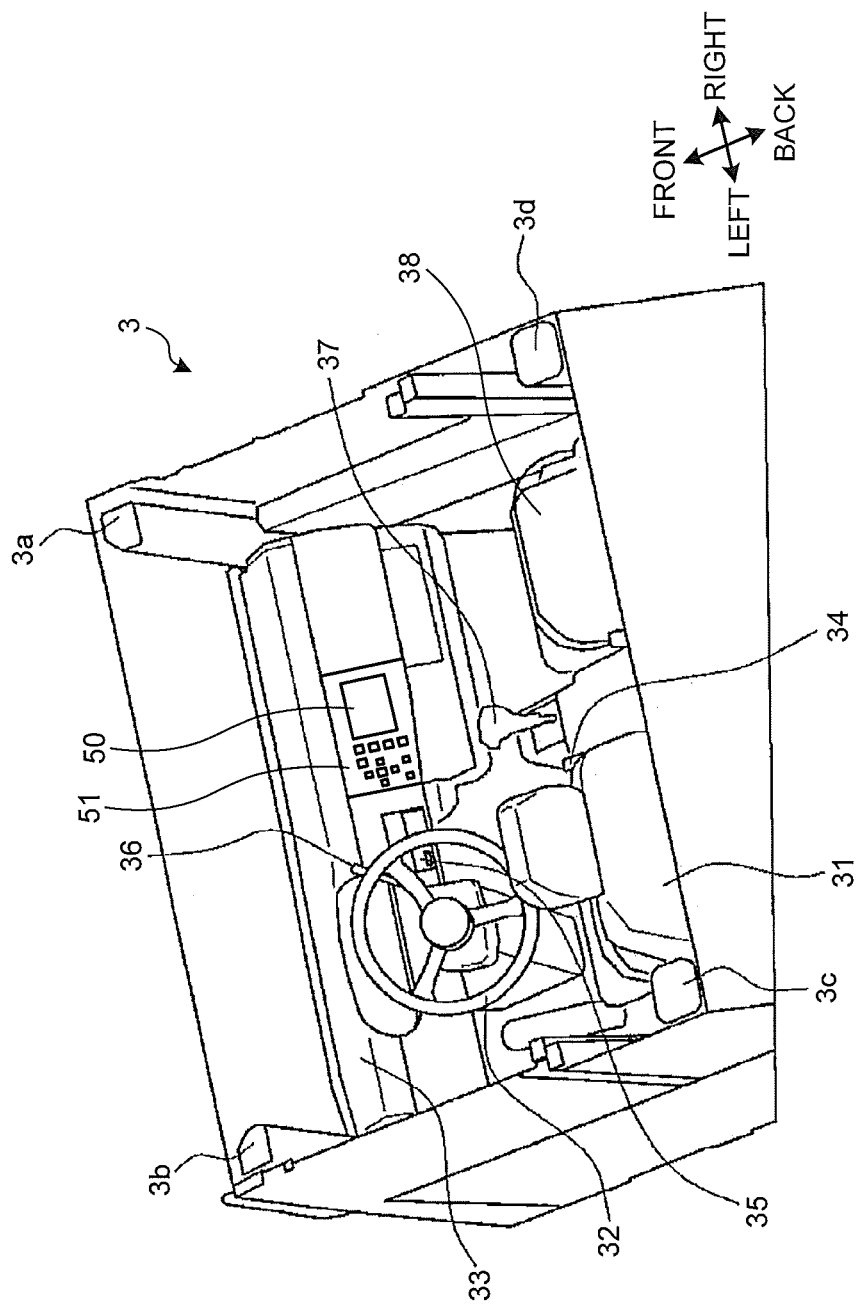
FIG. 2 is a diagram which illustrates a structure of a cab 3 which is included in the work vehicle according to the embodiment, and the inside thereof.

FIG. 1 is a perspective view which illustrates a work vehicle according to an embodiment. FIG. 2 is a diagram which illustrates a structure of a cab 3 which is included in a work vehicle according to the embodiment, and the inside thereof. According to the embodiment, a dump truck 1 (also referred to as an off-highway truck) as the work vehicle is a supersized self-propelled vehicle which is used in works in a mine or the like. The type of dump truck is not limited. The dump truck 1 may be an articulated type or the like. In addition, the work vehicle is not limited to the dump truck 1. The dump truck 1 includes a vehicle main body 2, the cab 3, a vessel 4, a front wheel 5, and a rear wheels 6. The vehicle main body 2 includes a frame $2f$ which is arranged along an upper deck $2b$ and the forward-backward direction. In addition, the dump truck 1 includes a periphery monitoring system which monitors the periphery thereof, and displays the result. The periphery monitoring system will be described in detail below.

According to the embodiment, the dump truck 1 drives an electric motor using power which is generated when an internal combustion engine such as a diesel engine drives an electric motor, and drives the rear wheels 6. In this manner, the dump truck 1 is a so-called electric drive type, however, the drive type of the dump truck 1 is not limited to this. For example, the dump truck 1 may be a dump truck which transmits power of the internal combustion engine to the rear wheels 6 through a transmission, and drives the rear wheels, and may be a dump truck in which the electric motor is driven using power which is supplied from an overhead power line through a trolley, and the rear wheels 6 are driven by the electric motor.

The frame $2f$ supports the internal combustion engine, the electric motor, and the like of a power generation mechanism, and auxiliary equipment thereof. The front wheels 5 in right and left (only the right front wheel is denoted in FIG. 1) are supported at the front portion of the frame $2f$. The rear wheels 6 in right and left (only the right rear wheel is denoted in FIG. 1) are supported at the rear portion of the frame $2f$. Diameters of the front wheels 5 and the rear wheels 6 are approximately 2 m (meter) to 4 m (meter). The frame $2f$ includes a lower deck $2a$ and the upper deck $2b$. In this manner, the dump truck 1 which is used in a mine has a double deck structure having the lower deck 2a and the upper deck 2b.

The lower deck 2a is attached to the lower portion of the front face of the frame 2f. The upper deck 2b is arranged above the lower deck 2a. A movable ladder 2c which is used, for example, when getting on and off the cab 3, is arranged at the lower part of the lower deck 2a. An inclined ladder 2d for coming and going between both the lower deck 2a and the upper deck 2b is arranged therebetween. In addition, a radiator is arranged between the lower deck 2a and the upper deck 2b. Palisade handrails 2e are arranged on the upper deck 2b. According to the embodiment, the ladder 2c and the inclined ladder 2d are set as parts of the upper deck 2b and the lower deck 2a.

As illustrated in FIG. 1, the cab (driver's cab) 3 is arranged on the upper deck 2b. The cab 3 is arranged on the upper deck 2b by being deviated to one side in the vehicle width direction of the center in the vehicle width direction. Specifically, the cab 3 is arranged to the left of the center in the vehicle width direction on the upper deck 2b. The arrangement of the cab 3 is not limited to the left of the center in the vehicle width direction. For example, the cab 3 may be arranged on the right side of the center in the vehicle width direction. Operation members such as a driver's seat, a steering wheel, a shift lever, an accelerator pedal, a brake pedal are arranged in the cab 3.

As illustrated in FIG. 2, the cab 3 includes a ROPS (Roll-Over Protection System) including a plurality of pillars (four in the embodiment) 3a, 3b, 3c, and 3d. The ROPS protects an operator in the cab 3 when the dump truck 1 turns over in case of an emergency. A driver of the dump truck 1 travels in a state in which a road shoulder on the left side of the vehicle main body 2 can be easily confirmed, however, in order to confirm the periphery of the vehicle main body 2, it is necessary for the driver to move his head considerably. In addition, a plurality of side mirrors (not illustrated) are provided in the upper deck 2b in order to confirm the periphery of the dump truck 1. Since these side mirrors are arranged at positions which are separated from the cab 3, it is necessary for the driver to move his head considerably even when the driver confirms the periphery of the vehicle main body 2 using the side mirrors.

As illustrated in FIG. 2, a driver's seat 31, a steering wheel 32, a dash cover 33, a wireless unit 34, a radio receiver 35, a retarder 36, a shift lever 37, a trainer's seat 38, a controller as monitor and control equipment (described in detail below) which is not illustrated in FIG. 2, a monitor 50, a control panel 51, an accelerator pedal, a brake pedal, and the like, are provided in the cab 3. The monitor 50 is illustrated by being incorporated with the dash cover 33 in FIG. 2, however, the monitor may be provided on the dash cover 33, or may be provided by being hung from a ceiling in the cab 3. That is, the monitor may be provided at a position from which an operator can view the monitor 50. According to the embodiment, the driver's seat 31 is provided on the left side of the cab 3, however, the position of the driver's seat 31 is not limited to this. In addition, the controller which is not illustrated in FIG. 2 is a part of the periphery monitoring system 10 to be described below. The shift lever 37 is a unit in which the operator of the dump truck 1 switches the travelling direction of the dump truck 1, or switches a velocity stage.

The vessel 4 which is illustrated in FIG. 1 is a container for loading a cargo such as a broken stone. The rear portion of the base of the vessel 4 is rotatably connected to the rear portion of the frame 2f through a rotating pin. The vessel 4 can take a loading posture and a rising posture using an actuator such as a hydraulic cylinder. As illustrated in FIG. 1, the loading posture is a posture in which the front portion of the vessel 4 is located above the cab 3. The rising posture is a posture of discharging the cargo, and is a posture in which the vessel 4 is tilted toward the rear side and the lower side. When the front portion of the vessel 4 rotates upward, the vessel 4 is changed to the rising posture from the loading posture. The vessel 4 has a flange portion 4F on the front side. The flange portion 4F is also referred to as a protector, extended to the upper part of the cab 3, and covers the cab 3. The flange portion 4F which is extended to the upper part of the cab 3 protects the cab 3 from a collision with the broken stone or the like.

<Periphery Monitoring System>

Figure 3:
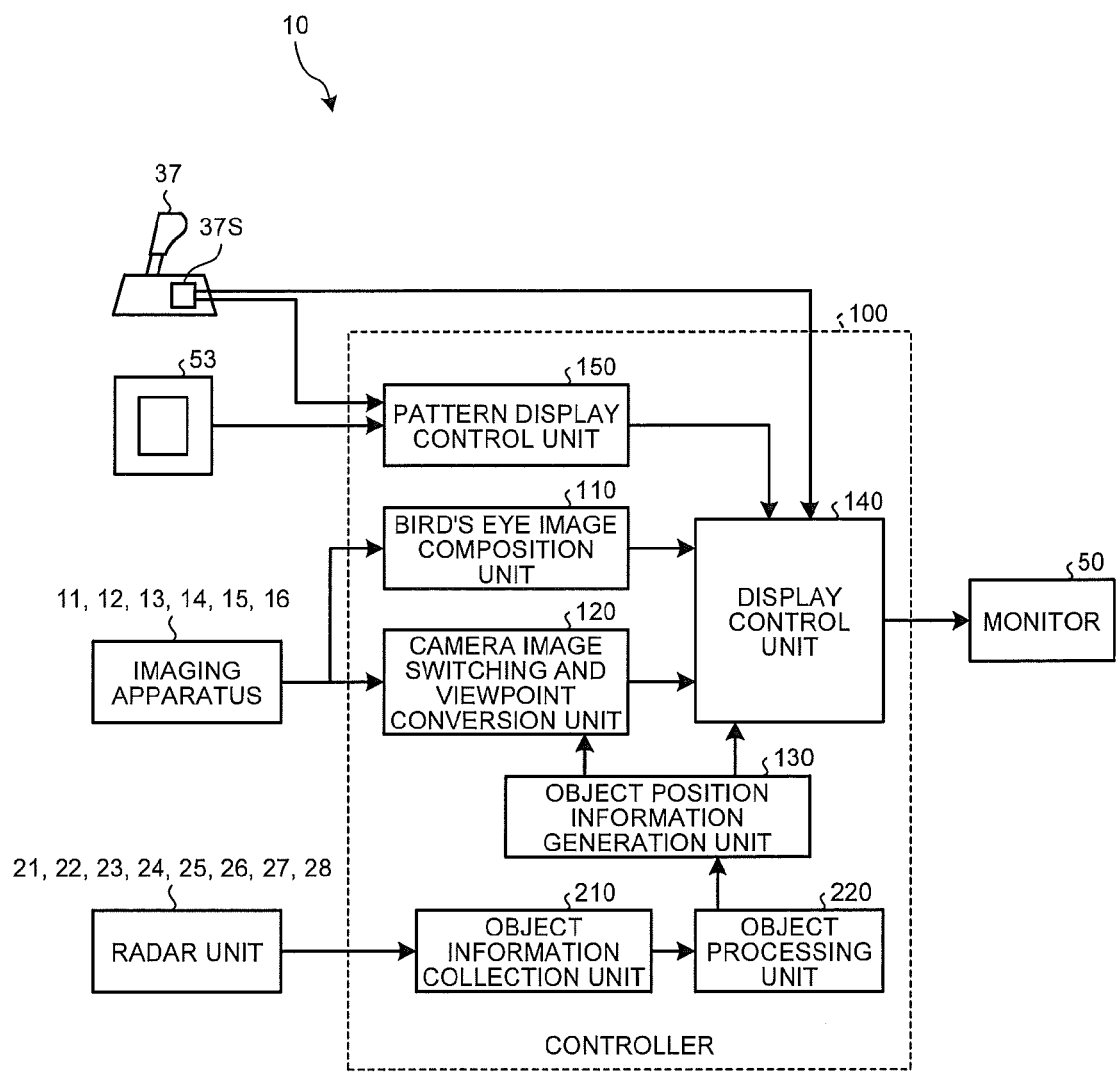
FIG. 3 is a diagram which illustrates a periphery monitoring system 10 according to the embodiment.
Figure 4:
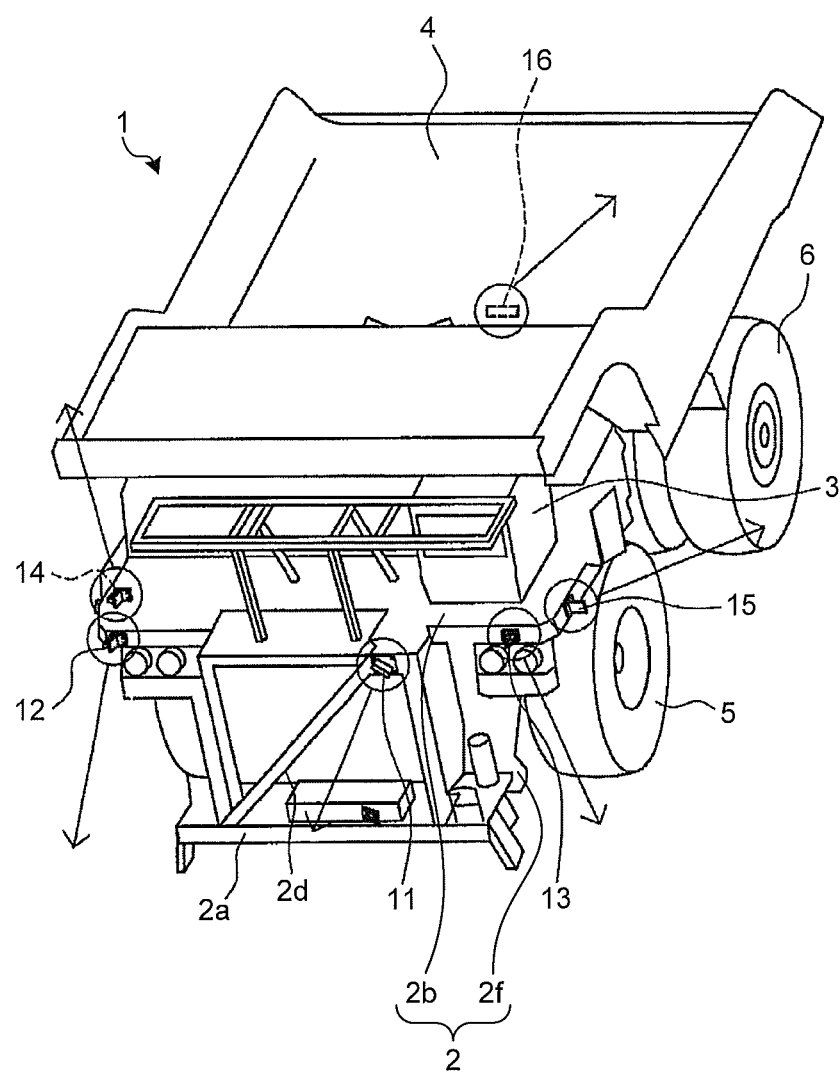
FIG. 4 is a perspective view of a dump truck 1 which is mounted with imaging apparatuses 11 to 16 which are included in the periphery monitoring system 10 according to the embodiment.
Figure 5:
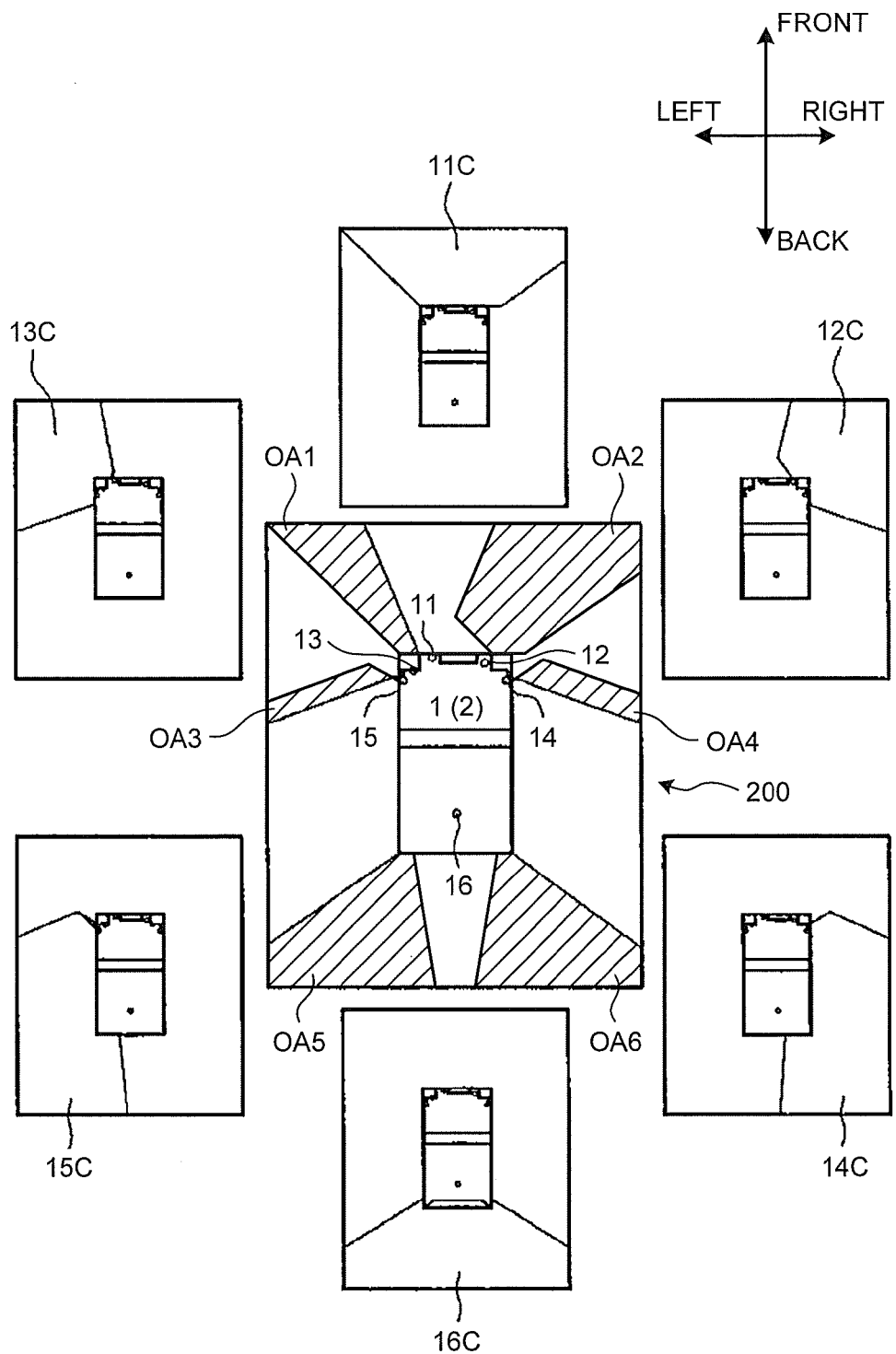
FIG. 5 is a schematic diagram which illustrates a bird's eye image 200 which is generated based on regions which are imaged using the plurality of imaging apparatuses 11 to 16, and pieces of information of images which are imaged using the plurality of imaging apparatuses 11 to 16.

FIG. 3 is a diagram which illustrates the periphery monitoring system 10 according to the embodiment. FIG. 4 is a perspective view of the dump truck 1 which is mounted with the imaging apparatuses 11 to 16 which are included in the periphery monitoring system 10 according to the embodiment. FIG. 5 is a schematic diagram which illustrates a bird's eye image 200 which is generated based on the region which is imaged using the plurality of imaging apparatuses 11 to 16, and information of images which are imaged using the imaging apparatuses 11 to 16. Regions which are illustrated in FIG. 5, and are imaged using the plurality of imaging apparatuses are regions based on the ground. As illustrated in FIG. 3, the periphery monitoring system 10 includes the plurality of (six in the embodiment) imaging apparatuses 11, 12, 13, 14, 15, and 16, a plurality of radar units 21, 22, 23, 24, 25, 26, 27, and 28 (eight in the embodiment), the monitor 50, and a controller 100 as the monitor and control equipment. According to the embodiment, the radar units 21 to 28 are not necessarily needed.

In the monitor 50, for example, a liquid crystal display may be used. In addition, the monitor 50 may be a monitor in which a touch panel is used, a function of a screen switching switch 53 to be described below, a screen operating function or the like is included in the touch panel, and switching or the like of a screen can be performed by touching the touch panel.

<Imaging Apparatus>

The imaging apparatuses 11, 12, 13, 14, 15, and 16 are attached to the dump truck 1. The imaging apparatuses 11, 12, 13, 14, 15, and 16 are, for example, wide dynamic range (WDR) cameras. The wide dynamic range camera is a camera which includes a function of correcting a dark portion to be bright while maintaining a level of a bright portion to be visible, and adjusting so that the entire portion can be visible all over. In addition, the bird's eye image 200 may be generated using at least one imaging apparatus. It is also possible to make the monitor 50 display the first image 2A (first image 2A will be described in detail below) by generating the bird's eye image 200 of only the front side, or only the rear side of the dump truck 1 even when including the plurality of imaging apparatuses. However, it is more preferable since the entire periphery of the dump truck 1 is imaged, the bird's eye image 200 in the entire periphery can be generated, and the entire periphery of the dump truck 1 can be monitored, by including the plurality of imaging apparatuses.

The imaging apparatuses 11, 12, 13, 14, 15, and 16 image the periphery of the dump truck 1, and output images as image information. Hereinafter, the imaging apparatus 11 is referred to as a first imaging apparatus 11, the imaging apparatus 12 is referred to as a second imaging apparatus 12, the imaging apparatus 13 is referred to as a third imaging apparatus 13, the imaging apparatus 14 is referred to as a fourth imaging apparatus 14, the imaging apparatus 15 is referred to as a fifth imaging apparatus 15, and the imaging apparatus 16 is referred to as a sixth imaging apparatus 16, suitably. In addition, when it is not necessary to distinguish these from each other, these are appropriately referred to as the imaging apparatuses 11 to 16.

As illustrated in FIG. 4, six imaging apparatuses 11 to 16 are attached to the outer peripheral portions of the dump truck 1 in order to image images in a range of 360° in the periphery of the dump truck 1. According to the embodiment, the respective imaging apparatuses 11 to 16 have a field of vision range of 120° (each 60° in right and left) in the lateral direction, and 96° in the vertical direction, however, the field of vision range is not limited to this. In addition, arrows are denoted from the respective imaging apparatuses 11 to 16, in FIG. 4, however, directions of the arrows denote the directions to which the respective imaging apparatuses 11 to 16 are facing.

As illustrated in FIG. 4, the first imaging apparatus 11 is attached to the front face of the dump truck 1. Specifically, the first imaging apparatus 11 is arranged at the upper end portion of the inclined ladder 2d, more specifically, the lower portion of the landing portion on the uppermost stage. The first imaging apparatus 11 is fixed toward the front side of the dump truck 1 through a bracket which is attached to the upper deck 2b. As illustrated in FIG. 5, the first imaging apparatus 11 images a first region 11C among regions which are present in the periphery of the dump truck 1, and outputs first image information as image information. The first region 11C is a region which extends toward the front side of the vehicle main body 2 of the dump truck 1.

As illustrated in FIG. 4, the second imaging apparatus 12 is attached to one side portion of the front face of the dump truck 1. Specifically, the second imaging apparatus 12 is arranged on the right side portion of the front face of the upper deck 2b. The second imaging apparatus 12 is fixed toward the inclined front side on the right of the dump truck 1 through the bracket which is attached to the upper deck 2b. As illustrated in FIG. 5, the second imaging apparatus 12 images a second region 12C among regions which are present in the periphery of the dump truck 1, and outputs second image information as image information. The second region 12C is a region which extends toward the inclined front side on the right of the vehicle main body 2 of the dump truck 1.

As illustrated in FIG. 4, the third imaging apparatus 13 is attached to the other side portion of the front face of the dump truck 1. Specifically, the third imaging apparatus 13 is arranged on the left side portion of the front face Of the upper deck 2b. In addition, the third imaging apparatus 13 is arranged so as to become bilaterally symmetric to the second imaging apparatus 12 with respect to an axis which passes through the center of the dump truck 1 in the width direction. The third imaging apparatus 13 is fixed toward the inclined front side on the left of the dump truck 1 via the bracket attached to the upper deck 2b. As illustrated in FIG. 5, the third imaging apparatus 13 images a third region 13C among regions which are present in the periphery of the dump truck 1, and outputs third image information as image information. The third region 13C is a region which extends toward the inclined front side on the left of the vehicle main body 2 of the dump truck 1.

As illustrated in FIG. 4, the fourth imaging apparatus 14 is attached to one side surface of the dump truck 1. Specifically, the fourth imaging apparatus 14 is arranged at the front portion on the right side surface of the upper deck 2b. The fourth imaging apparatus 14 is fixed toward the inclined rear side on the right of the dump truck 1 through a bracket which is attached to the upper deck 2b. As illustrated in FIG. 5, the fourth imaging apparatus 14 images a fourth region 14C among regions which are present in the periphery of the dump truck 1, and outputs fourth image information as image information. The fourth region 14C is a region which extends toward the inclined rear side on the right of the vehicle main body 2 of the dump truck 1.

As illustrated in FIG. 4, the fifth imaging apparatus 15 is attached to the other side surface of the dump truck 1. Specifically, the fifth imaging apparatus 15 is arranged on the front portion of the left side surface of the upper deck 2b. In addition, the fifth imaging apparatus 15 is arranged so as to become bilaterally symmetric to the fourth imaging apparatus 14 with respect to the axis which passes through the center of the dump truck 1 in the width direction. As illustrated in FIG. 5, the fifth imaging apparatus 15 images a fifth region 15C among regions which are present in the periphery of the dump truck 1, and outputs fifth image information as image information. The fifth region 15C is a region which extends toward the inclined rear side on the left of the vehicle main body 2 of the dump truck 1.

As illustrated in FIG. 4, the sixth imaging apparatus 16 is attached to the rear portion of the dump truck 1. Specifically, the sixth imaging apparatus 16 is arranged at the upper part of an axle housing which connects two rear wheels 6 and 6 as the rear end of the frame 2f, and in the vicinity of a rotating axis of the vessel 4. The sixth imaging apparatus 16 is fixed toward the rear side of the dump truck 1 through a bracket which is attached to a cross bar which connects the frames 2f on the right and left. As illustrated in FIG. 5, the sixth imaging apparatus 16 images a sixth region 16C among regions which are present in the periphery of the dump truck 1, and outputs sixth image information as image information. The sixth region 16C is a region which extends toward the rear side of the vehicle main body 2 of the dump truck 1.

The periphery monitoring system 10 according to the embodiment is able to image the dump truck 1 of the whole circumference 360° as illustrated at the centre in FIG. 5, and to obtain the image information using the above described six imaging apparatuses 11 to 16. The six imaging apparatuses 11 to 16 transmit the first to sixth pieces of image information as pieces of image information which are obtained by the six imaging apparatuses, respectively, to the controller 100 illustrated in FIG. 3.

The first imaging apparatus 11, the second imaging apparatus 12, the third imaging apparatus 13, the fourth imaging apparatus 14, and the fifth imaging apparatus 15 are provided at the upper deck 2b which is located at a relatively high position. For this reason, the controller 100 is able to obtain images which overview the ground from above using the first imaging apparatus 11 to the fifth imaging apparatus 15, and to image an object such as a vehicle which is present on the ground in a wide range. In addition, even when a viewpoint conversion is performed by the controller 100 at the time of generating the bird's eye image 200 which is illustrated in FIG. 5 from the first to sixth pieces of image information which are obtained by the first to sixth imaging apparatuses 11 to 16, since the first to fifth pieces of information among the first to sixth pieces of information are pieces of information which are obtained by being imaged from above, a degree of transformation of a three-dimensional object is suppressed.

In the periphery monitoring system 10, a wide dynamic range camera is used in the imaging apparatuses 11 to 16.

For this reason, the imaging apparatuses 11 to 16 can correct a dark portion such as a portion which becomes a shadow of the dump truck 1 while maintaining a bright portion to a level which is visible. Accordingly, in the images which are imaged by the imaging apparatuses 11 to 16, paint-out in black and halation hardly occur, and the images becomes images which are further easily grasped as a whole. As a result, the periphery monitoring system 10 which includes the imaging apparatuses 11 to 16 is able to display the bird's eye image 200, in which an object such as a vehicle which is present in a region as a shadow of the dump truck 1 is easily viewed, on the monitor 50. In this manner, the periphery monitoring system 10 can display an object in the periphery of the dump truck 1 in the bird's eye image 200 even in a circumstance in which a contrast difference in light and shade is big, when monitoring the periphery of the dump truck 1 using the images which are imaged by the imaging apparatuses 11 to 16. As a result, an operator of the dump truck 1 is able to reliably view the periphery of the dump truck 1, in particular, the object which is present in the region of the shadow regardless of the circumstance.

In this manner, since the periphery monitoring system 10 can generate the bird's eye image 200 in which the object in the periphery of the dump truck 1 can be reliably displayed even in a circumstance in which the contrast difference in light and shade is big, the periphery monitoring system can reliably view the object which is present in a blind spot of the operator using the bird's eye image 200. Accordingly, the periphery monitoring system 10 is remarkably effective when monitoring the periphery of the supersized dump truck 1 which is used in a mine. That is, there is a case in which the dump truck 1 forms an extremely large shadow, and moves to a region while forming the region to be a shadow by itself, further, the region which becomes a shadow due to a rise and fall of the vessel 4 is considerably changed, and a region as the blind point becomes large. In such a dump truck 1, the periphery monitoring system 10 is able to generate the bird's eye image 200 which reliably displays an object in the periphery of the dump truck 1, and to provide accurate information in the periphery of the dump truck 1 to the operator of the dump truck 1. In addition, the periphery monitoring system 10 is able to provide accurate information in the periphery of the dump truck 1 to the operator of the dump truck 1 with respect to the dump truck 1 which is operated in a place in which an illumination difference between a sunny place and shade is extremely large such as just under the equator.

<Radar Unit>

Figure 6:
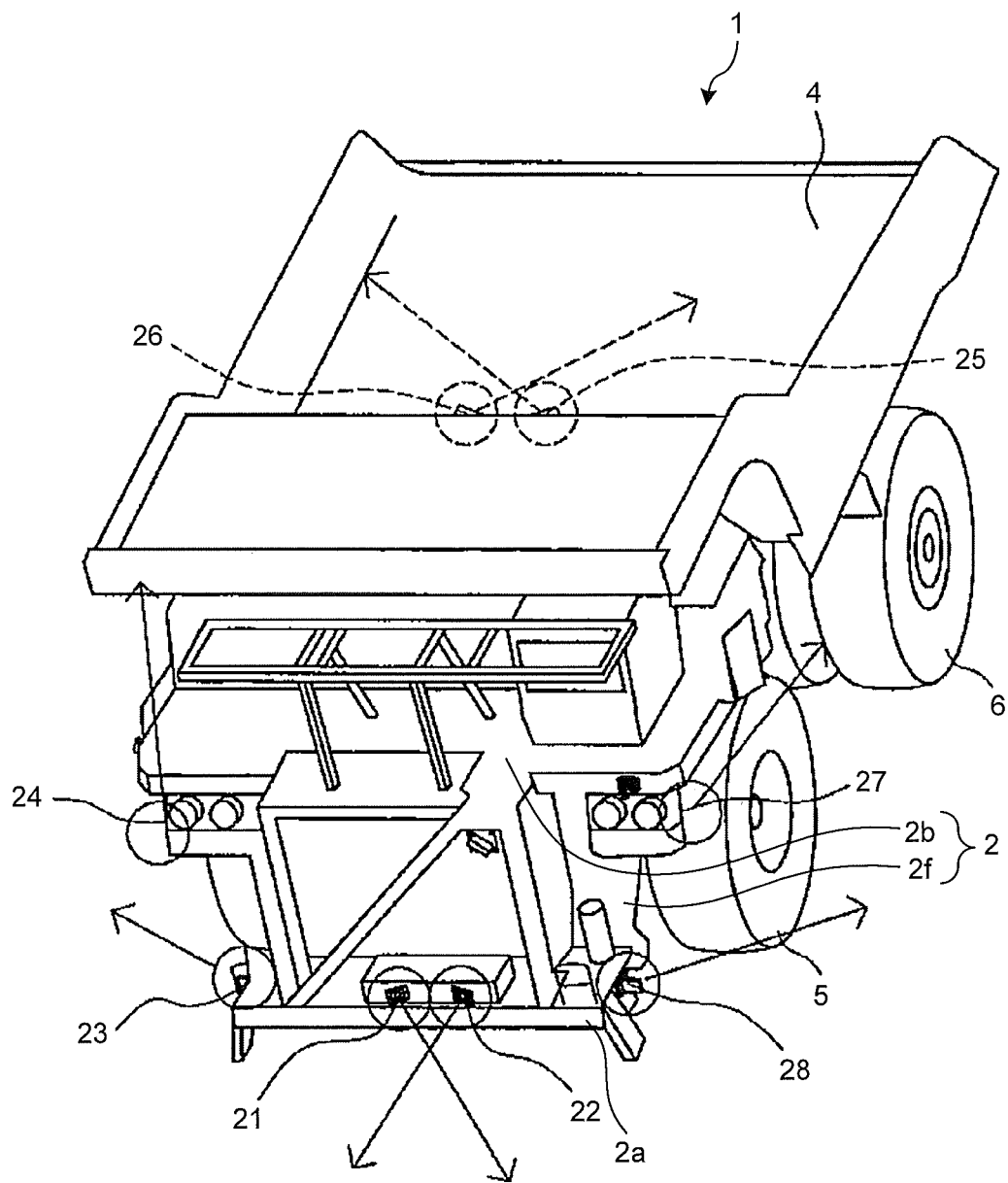
FIG. 6 is a perspective view which illustrates arrangements of radar units 21 to 28.
Figure 7:
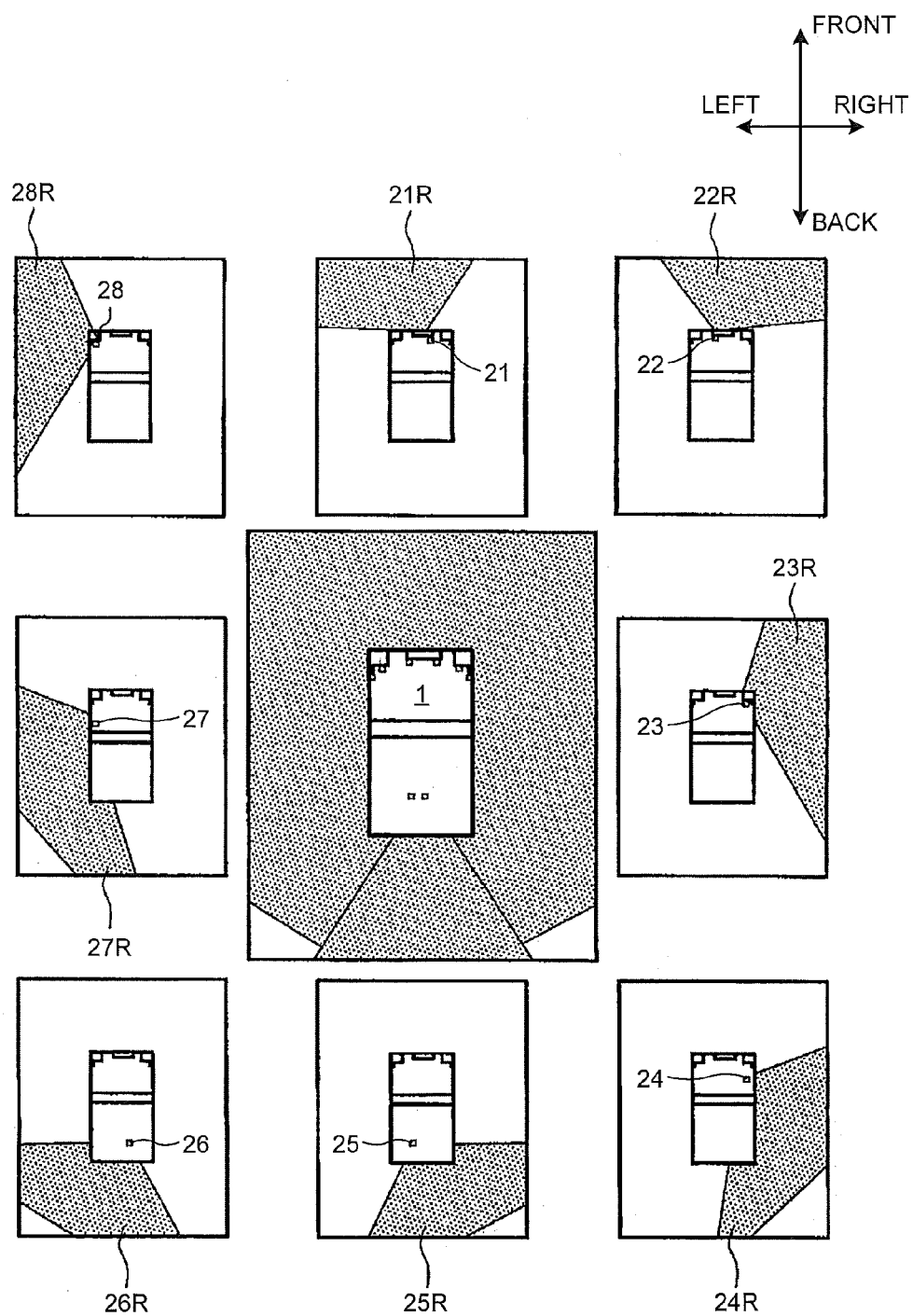
FIG. 7 is a diagram which illustrates detection ranges of the radar units 21 to 28.

FIG. 6 is a perspective view which illustrates arrangements of the radar units 21 to 28. FIG. 7 is a diagram which illustrates a detection range of the radar units 21 to 28. The radar units 21, 22, 23, 24, 25, 26, 27, and 28 (hereinafter, appropriately referred to as radar units 21 to 28) as material body detection units are UWB (Ultra Wide Band) radars in which a direction is +/−80° (40° in right and left), and a detection distance is maximum 15 m or more. The radar units 21 to 28 detect a relative position of an object which is present in the periphery of the dump truck 1 to the dump truck 1. The respective radar units 21 to 28 are attached to outer peripheral portions of the dump truck 1, similarly to the imaging apparatuses 11 to 16. In addition, though arrows are denoted from the respective radar units 21 to 28 in FIG. 6, directions of these arrows denote the directions in detection ranges of the respective radar units 21 to 28.

As illustrated in FIG. 6, the radar unit 21 (appropriately referred to as the first radar unit 21) is arranged at the front of the vehicle main body 2 in the lower deck 2a which is arranged at the height of approximately one meter from the ground, and slightly to the right side of the center of the vehicle main body 2 in the width direction. As illustrated in FIG. 7, a detection range 21R of the first radar unit 21 is a range which extends to the inclined front side on the left from the front side of the vehicle main body 2 of the dump truck 1.

As illustrated in FIG. 6, the radar unit 22 (appropriately referred to as the second radar unit 22) is arranged at the front of the vehicle main body 2 in the lower deck 2a, and slightly to the left side of the center of the vehicle main body 2 in the width direction. That is, the second radar unit 22 is arranged on the left side of the first radar unit 21 by being close to the first radar unit 21. As illustrated in FIG. 7, a detection range 22R of the second radar unit 22 is a range which extends to the inclined front side on the right from the front side of the vehicle main body 2 of the dump truck 1.

As illustrated in FIG. 6, the radar unit 23 (appropriately referred to as the third radar unit 23) is arranged in the vicinity of the front end portion on the right side surface of the lower deck 2a. As illustrated in FIG. 7, a detection range 23R of the third radar unit 23 is a range which extends to the right side from the inclined front side on the right of the vehicle main body 2 of the dump truck 1.

As illustrated in FIG. 6, the radar unit 24 (appropriately referred to as the fourth radar unit 24) is arranged in the vicinity of the end portion on the right side of the side portion of the vehicle main body 2 at a position of the height between the lower deck 2a and the upper deck 2b. As illustrated in FIG. 7, a detection range 24R of the fourth radar unit 24 is a range which extends to the rear side from the right side of the vehicle main body 2 of the dump truck 1.

As illustrated in FIG. 6, the radar unit 25 (appropriately referred to as the fifth radar unit 25) is arranged at the upper part of an axle which transmits a driving power to the rear wheels 6 in right and left of the dump truck 1, which is the lower part of the vessel 4. As illustrated in FIG. 7, a detection range 25R of the fifth radar unit 25 is a range which extends to the rear side from the inclined rear side on the right of the vehicle main body 2 of the dump truck 1.

As illustrated in FIG. 6, the radar unit 26 (appropriately referred to as the sixth radar unit 26) is arranged close to the right side of the fifth radar unit 25, which is the upper part of the axle, similarly to the fifth radar unit 25. As illustrated in FIG. 7, a detection range 26R of the sixth radar unit 26 is a range which extends to the rear side from the inclined rear side on the left of the vehicle main body 2 of the dump truck 1 so as to cross the detection range of the fifth radar unit 25.

As illustrated in FIG. 6, the radar unit 27 (appropriately referred to as the seventh radar unit 27) is arranged in the vicinity of left side end portion of the side surface of the vehicle main body 2 at a position of the height between the lower deck 2a and the upper deck 2b, that is, a position which is bilaterally symmetric to the fourth radar unit 24 with respect to the center axis of the vehicle main body 2 in the width direction. As illustrated in FIG. 7, a detection range 27R of the seventh radar unit 27 is a range which extends to the rear side from the left side of the vehicle main body 2 of the dump truck 1.

As illustrated in FIG. 6, the radar unit 28 (appropriately referred to as the eighth radar unit 28) is arranged in the vicinity of front end portion on the left side surface of the lower deck 2a, that is, at a position which is bilaterally symmetric to the third radar unit 23 with respect to the center axis of the vehicle main body 2 in the width direction. As illustrated in FIG. 7, a detection range 28R of the eighth radar unit 28 is a range which extends to the left side from the obliquely front side on the left of the vehicle main body 2 of the dump truck 1.

As illustrated in FIG. 7, the eight radar units 21 to 28 are able to detect a position of an object relative to the dump truck 1 having the whole circumference of 360° in the periphery of the dump truck 1 as the detection range. The eight radar units 21 to 28 transmit relative position information indicating a relative position of objects which are respectively detected to the dump truck 1 to the controller 100. In this manner, the plurality of (eight) radar units 21 to 28 are able to detect a material body which is present in the whole circumferential range of the vehicle main body 2 by being provided in the vehicle main body 2. Subsequently, the controller 100 which is provided in the periphery monitoring system 10 will be described.

<Controller>

The controller 100 which is illustrated in FIG. 3 displays the presence or absence of an object in the periphery of the dump truck 1 using the imaging apparatuses 11 to 16 and the radar units 21 to 28 in the bird's eye image 200, and informs an operator of the presence of the object as necessary. As illustrated in FIG. 3, the controller 100 includes a bird's eye image composition unit 110, a camera image switching and viewpoint conversion unit 120, an object position information generation unit 130, a display control unit 140, a pattern display control unit 150, an object information collection unit 210, and an object processing unit 220.

The bird's eye image composition unit 110 is connected to the imaging apparatuses 11 to 16 as illustrated in FIG. 3. The bird's eye image composition unit 110 receives a plurality of pieces of image information (first to sixth pieces of image information) which are imaged by the respective imaging apparatuses 11 to 16, and are generated. In addition, the bird's eye image composition unit 110 composites an image corresponding to the received plurality of pieces of image information, and generates the bird's eye image 200 including the whole periphery of the dump truck 1 as an image based on the pieces of image information which are output from the imaging apparatuses 11 to 16. Specifically, the bird's eye image composition unit 110 generates bird's eye image information for displaying the bird's eye image 200 in which a plurality of images are projected on a predetermined projected plane on the monitor 50, by performing a coordinate conversion of the plurality of pieces of image information, respectively.

As illustrated in FIG. 3, the camera image switching and viewpoint conversion unit 120 is connected to the imaging apparatuses 11 to 16. In addition, the camera image switching and viewpoint conversion unit 120 switches images which are imaged by each of the imaging apparatuses 11 to 16 which are displayed on a screen of the monitor 50 along with the bird's eye image 200 according to an obstacle detection result, or the like, using the radar units 21 to 28. In addition, the camera image switching and viewpoint conversion unit 120 converts image information which is obtained by each of the imaging apparatuses 11 to 16 to image information from a viewpoint from an upward infinity.

As illustrated in FIG. 3, the object position information generation unit 130 is connected to the camera image switching and viewpoint conversion unit 120, the display control unit 140, and the object processing unit 220. The object position information generation unit 130 generates object position information for compositing and displaying position information of an object which is obtained using the radar units 21 to 28 in the bird's eye image 200 which is formed by compositing image information which is obtained by each of the imaging apparatuses 11 to 16, and transmits the position information to the camera image switching and viewpoint conversion unit 120, and the display control unit 140.

As illustrated in FIG. 3, the display control unit 140 is connected to the bird's eye image composition unit 110, the camera image switching and viewpoint conversion unit 120, the object position information generation unit 130, and the pattern display control unit 150. The display control unit 140 is able to obtain an output from the bird's eye image composition unit 110, the camera image switching and viewpoint conversion unit 120, or the like which is connected to itself. The display control unit 140 generates the bird's eye image 200 including a position of an object based on the bird's eye image information in the whole periphery of the dump truck 1 which is generated by the bird's eye image composition unit 110, and the object position information in the whole periphery of the dump truck 1 which is obtained using the radar units 21 to 28. The image is displayed on the monitor 50. In addition, the display control unit 140 displays a first image in which a mark detected by the radar units 21 to 28 indicating a material body (hereinafter, appropriately referred to as object) which is present in the periphery of the dump truck 1 is overlapped with the bird's eye image 200 based on the bird's eye image information, and a second image which is imaged by the imaging apparatuses 11 to 16 on the same screen as that of the monitor 50. Further, a pattern indicating information relating to the periphery monitoring system 10 (hereinafter, appropriately referred to as system information) is displayed on the monitor 50. The pattern indicating the system information is a pattern which expresses the system information by symbolizing the information as a simple pattern. Hereinafter, the pattern indicating the system information is appropriately referred to as an icon. The system information will be described in detail later.

According to the embodiment, the screen which is displayed on the monitor 50 can be switched by an operation of an operator of the dump truck 1. In addition, the screen which is displayed on the monitor 50 is switched according to a state of the dump truck 1, for example, a traveling mode of the dump truck 1. For this reason, in the embodiment, the display control unit 140 is electrically connected with the screen switching switch 53 which switches a screen of the monitor 50, and the shift lever 37, more specifically, a sensor 37S which detects a position of the shift lever 37. The display control unit 140 switches a screen of the monitor 50 according to an output from the screen switching switch 53, or the sensor 37S. In this manner, the screen switching switch 53, or the sensor 37S generates a display switching signal as a signal which switches a display of the monitor 50. The display switching signal which is generated by the sensor 37S is a signal which denotes a travelling mode of the dump truck 1, more specifically, a signal which denotes the travelling direction of the dump truck 1, or a signal which denotes a velocity stage.

As illustrated in FIG. 3, the pattern display control unit 150 is connected to the display control unit 140, and inputs its own output to the display control unit 140. The pattern display control unit 150 changes a display position as a position at which an icon indicating system information is displayed on the monitor 50 before and after a display of the monitor 50 is switched based on a display switching signal. For this reason, the pattern display control unit 150 is electrically connected with the screen switching switch 53, and the sensor 37S of the shift lever 37. The pattern display control unit 150 obtains display switching signals which are generated by these, and changes a display position of an icon which denotes system information on the screen of the monitor 50 based on the signals.

As illustrated in FIG. 3, the object information collection unit 210 is connected to the radar units 21 to 28, and the object processing unit 220. The object information collection unit 210 receives object detection results in detection ranges from each of the radar units 21 to 28, and transmits the results to the object processing unit 220.

As illustrated in FIG. 3, the object processing unit 220 is connected to the object information collection unit 210, and the object position information generation unit 130. The object processing unit 220 transmits position information of an object which is received from the object information collection unit 210 to the object position information generation unit 130.

The controller 100 is a controller, for example, in which a computer in which a CPU (Central Processing Unit) as an arithmetic unit, and a memory as a storage unit are combined, and an image processing device (for example, image board) which executes image processing such as compositing of a bird's eye image are combined. The image processing device is mounted with, for example, a dedicated IC (for example, FPGA: Field-Programmable Gate Array) which executes image processing such as compositing a bird's eye image, a memory (for example, VRAM: Video Random Access Memory), or the like.

According to the embodiment, as illustrated in FIG. 4, the imaging apparatuses 11 to 16 are arranged at the front, and on the side surface of the upper deck 2b, and on the lower part of the vessel 4. In addition, in the controller 100, pieces of first to sixth image information which are imaged and obtained by the imaging apparatuses 11 to 16 are composited, the bird's eye image 200 as illustrated in FIG. 5 is generated, and is displayed on the monitor 50 which is arranged at the front of the driver's seat 31 in the cab 3. At this time, the monitor 50 displays an image such as the bird's eye image 200 according to control of the controller 100. The bird's eye image 200 is obtained when the controller 100 composites the pieces of first to sixth image information which correspond to the first region 11C to the sixth region 16C, and are imaged by the imaging apparatuses 11 to 16. The periphery monitoring system 10 displays such the bird's eye image 200 on the monitor 50. For this reason, an operator of the dump truck 1 is able to the monitor 50 the whole peripheral range of 360° of the dump truck 1. Subsequently, the bird's eye image 200 will be described.

<Generating Bird's Eye Image>

Figure 8:
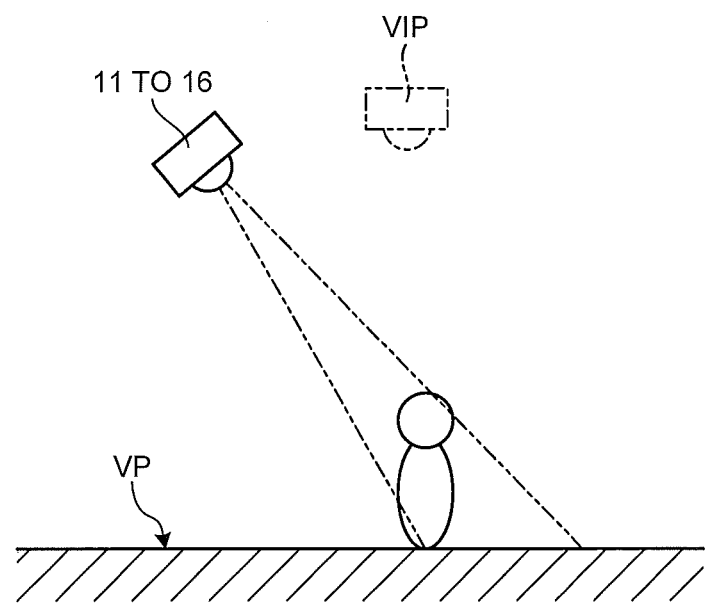
FIG. 8 is a diagram which illustrates a method of image conversion using a virtual plane of projection VP.

FIG. 8 is a diagram which illustrates an image conversion method using a virtual projected plane VP. The controller 100 creates the bird's eye image 200 in the periphery of the dump truck 1 based on a plurality of images which are denoted by the plurality of pieces of first to sixth image information. Specifically, the controller 100 executes a coordinate conversion of the pieces of first to sixth image information using predetermined conversion information. The conversion information is information which denotes a correspondence of a position coordinate of each pixel of an input image to a position coordinate of each pixel of an output image. According to the embodiment, the input images are images which are imaged by the imaging apparatuses 11 to 16, and images which correspond to the pieces of first to sixth image information. The output image is the bird's eye image 200 which is displayed on the monitor 50.

The controller 100 converts images which are imaged using the imaging apparatuses 11 to 16 to images which are viewed from a predetermined virtual viewpoint which is located above the dump truck 1 using the conversion image. Specifically, as illustrated in FIG. 5, the images which are imaged using the imaging apparatuses 11 to 16 are converted to images which are viewed from a predetermined virtual viewpoint VIP which is located above the dump truck 1 by being projected onto the predetermined virtual projected plane VP. The conversion information denotes the virtual projected plane VP. The converted image is a bird's eye image which is displayed on the monitor 50. The controller 100 generates the bird's eye image 200 in the periphery of the dump truck 1 by compositing the plurality of pieces of first to sixth image information which are obtained from the plurality of imaging apparatuses 11 to 16.

As illustrated in FIG. 5, regions in the periphery of the dump truck 1 which are imaged by the respective imaging apparatuses 11 to 16 are overlapped with each other in a first overlapped region OA1 to a sixth overlapped region OA6. The controller 100 overlappingly displays two images corresponding to the pieces of first to sixth image information from the imaging apparatuses 11 to 16 which are close to each other in the respective first to sixth overlapped regions OA1 to OA6, in the bird's eye image 200.

Specifically, the controller 100 overlappingly displays an image of the first image information from the first imaging apparatus 11, and an image of the third image information from the third imaging apparatus 13 in the first overlapping region OA1. In addition, the controller 100 overlappingly displays an image of the first image information from the first imaging apparatus 11, and an image of the second image information from the second imaging apparatus 12 in the second overlapping region OA2. In addition, the controller 100 overlappingly displays an image of the third image information from the third imaging apparatus 13, and an image of the fifth image information from the fifth imaging apparatus 15 in the third overlapping region OA3. In addition, the controller 100 overlappingly displays the image of the second image information from the second imaging apparatus 12, and an image of the fourth image information from the fourth imaging apparatus 14 in the fourth overlapping region OA4. In addition, the controller 100 overlappingly displays an image of the fifth image information from the fifth imaging apparatus 15, and an image of the sixth image information from the sixth imaging apparatus 16 in the fifth overlapping region OA5. In addition, the controller 100 overlappingly displays the image of the fourth image information from the fourth imaging apparatus 14, and the image of the sixth image information from the sixth imaging apparatus 16 in the sixth overlapping region OA6.

In this manner, when two pieces of image information are overlapped and composited in the first to sixth overlapped regions OA1 to OA6, a value in which the values of the pieces of first to sixth image information are multiplied by a composition rate is added. The composition rate is a value corresponding to the pieces of first to sixth image information, and is stored in the controller 100. For example, a composition rate is determined in each of the pieces of first to sixth image information such as a composition rate of 0.5 in the first image information, and a composition rate of 0.5 in the second image information. By using the composition rate, the plurality of pieces of image information are displayed by being averaged in the first to sixth overlapped regions OA1 to OA6. As a result, a rapid change in color and contrast is suppressed, and the controller 100 is able to create the natural bird's eye image 200. The controller 100 generates composite image information for displaying the bird's eye image 200 which is composited as described above, and outputs the information to the monitor 50.

<Imaging Range of Respective Imaging Apparatuses>

As illustrated in FIG. 4, in the dump truck 1, the first imaging apparatus 11, the second imaging apparatus 12, the third imaging apparatus 13, the fourth imaging apparatus 14, and the fifth imaging apparatus 15 are arranged at the upper deck 2b, and the sixth imaging apparatus 16 is arranged at the lower part of the vessel 4 as the rear end of the frame 2f. In particular, the second imaging apparatus 12 and the third imaging apparatus 13 cover from the inclined front in right and left to the sides in right and left of the vehicle main body 2 of the dump truck 1 as regions to be imaged. In addition, the fourth imaging apparatus 14 and the fifth imaging apparatus 15 cover from the sides in right and left to the inclined rear sides in right and left of the vehicle main body 2 of the dump truck 1 as regions to be imaged. In this manner, in the controller 100, it is possible to monitor the periphery of the dump truck 1 by generating the bird's eye image 200 which covers the whole periphery of the dump truck 1 by combining the pieces of first and sixth image information which are imaged and obtained by the first imaging apparatus 11 and the sixth imaging apparatus 16.

In addition, according to the embodiment, as illustrated in FIG. 5, the imaging apparatuses 11 to 16 which are adjacent to each other are arranged such that the first to sixth regions 11C to 16C as regions which can be imaged using the respective imaging apparatuses 11 to 16 are overlapped in an adjacent part to each other. The controller 100 is able to monitor the whole periphery of 360° on a plane of the dump truck 1 by providing connection lines at portions at which the first to sixth regions 11C to 16C as the regions which can be imaged using the respective imaging apparatuses 11 to 16 are overlapped with each other. In addition, in the bird's eye image 200, the connection lines which connect the first to sixth regions 11C to 16C which are close to each other can be set at arbitrary positions in overlapped ranges in the first to sixth regions 11C to 16C. Subsequently, control of the periphery monitoring system 10 of changing a display position of icons (appropriately referred to as icon display position control) when a display of the monitor 50 is switched will be described.

<Icon Display Position Control>

Figure 9:
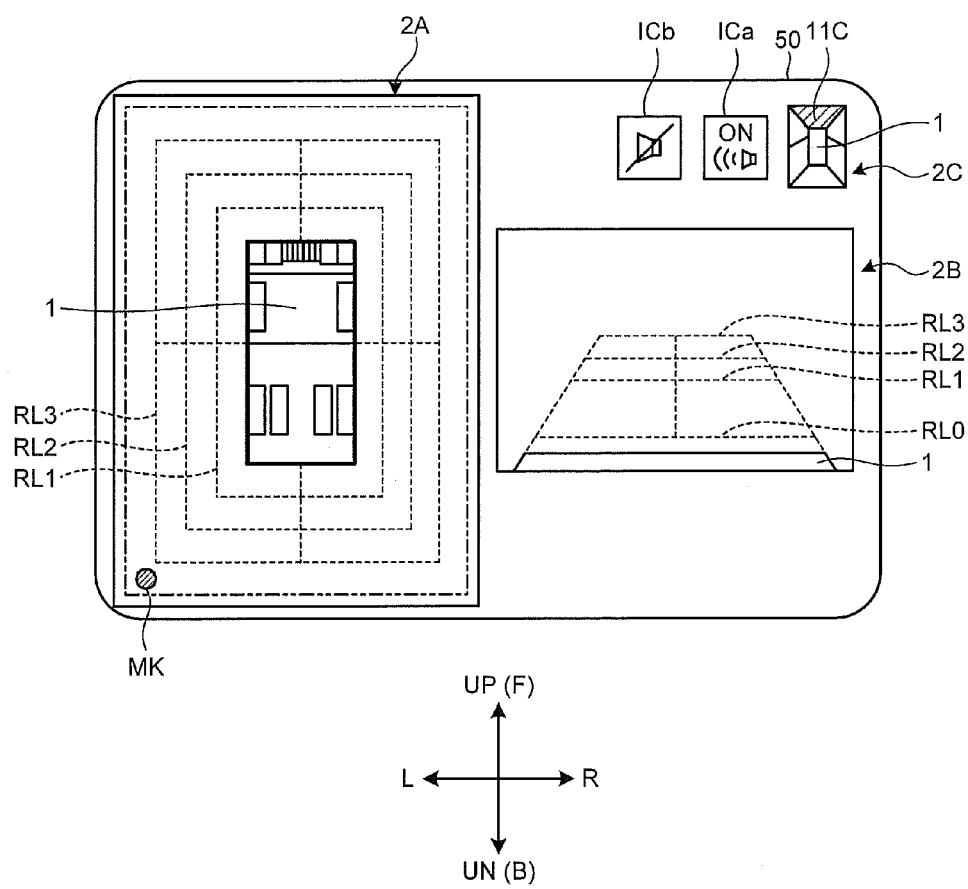
FIG. 9 is a diagram which illustrates a monitor 50 on which a first image 2A and a second image 2B are displayed.
Figure 10:
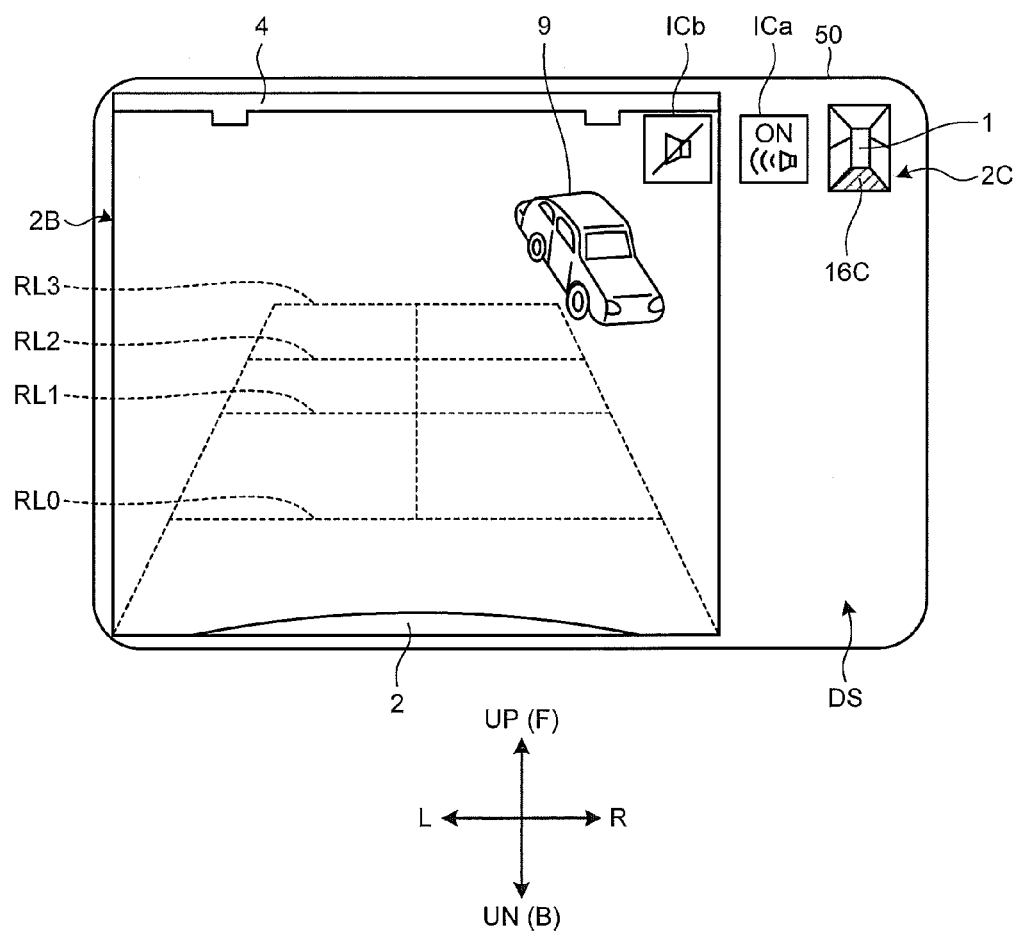
FIG. 10 is a diagram which illustrates the monitor 50 on which only the second image 2B is displayed.

FIG. 9 is a diagram which illustrates the monitor 50 on which the first image 2A and the second image 2B are displayed. FIG. 10 is a diagram which illustrates the monitor 50 on which only the second image 2B is displayed. The mark UP in FIGS. 9 and 10 denotes the upper side of the monitor 50, the mark UN denotes the lower side of the monitor 50, the mark L denotes the left side, and the mark R denotes the right side. The mark F denotes the front side, and the mark B denotes the rear side of the dump truck 1. These marks are the same as those in below. According to the embodiment, the dump truck 1 is displayed on the monitor 50 such that the upper side of the monitor 50 is the front side of the dump truck 1, and the lower side of the monitor 50 is the rear side of the dump truck 1. In addition, the vertical direction of the monitor 50 is the longitudinal direction of the monitor 50, and the lateral direction of the monitor 50 is the transverse direction (lateral direction) of the monitor 50.

Before starting of the dump truck 1, the display control unit 140 of the controller 100 of the periphery monitoring system 10 displays, for example, the first image 2A, the second image 2B, and the system information (any one, or plurality of icons 2C, ICa, and ICb) on the monitor 50. The first image 2A is an image in which the mark MK which denotes an object which is detected by at least any one of the plurality of radar units 21 to 28 is overlapped with the bird's eye image 200 which is illustrated in FIG. 5. An object such as a vehicle, or the like, which is detected by at least any one of the plurality of radar units 21 to 28 is displayed in the periphery of the dump truck 1 which is denoted in the first image 2A as the mark MK. A distance and a positional relationship between the mark MK and the dump truck 1 in the first image 2A correspond to a distance between an object corresponding to the mark MK and the dump truck 1. For this reason, an operator of the dump truck 1 is able to grasp the position and distance of the object which is present in the periphery of the dump truck 1 by viewing the first image 2A.

In the first image 2A, dotted lines RL1, RL2, and RL3 are denoted in the periphery of the dump truck 1. The dotted line RL1 is displayed at a position which is the closest to the dump truck 1, and the dotted line RL3 is displayed at a position which is the farthest from the dump truck 1. The dotted line RL2 is displayed between the dotted lines RL1 and RL3. The dotted lines RL1, RL2, and RL3 are indices which denote the respective distances from the dump truck 1. The distances from the dump truck 1 become distant in order of the dotted lines RL1, RL2, and RL3. An operator of the dump truck 1 can grasp a distance between an object corresponding to the mark MK which is displayed in the first image 2A and the dump truck 1 by the dotted lines RL1, RL2, and RL3.

The first image 2A is displayed on the left side of the screen of the monitor 50, that is, the side at which the driver's seat 31 is arranged, according to the embodiment. Since a display of the first image 2A is relatively detailed, the display control unit 140 causes an operator to easily view the first image 2A by displaying the first image 2A in the vicinity of the operator.

The second image 2B is an image (direct image) which is imaged by at least one of the plurality of imaging apparatuses 11 to 16 which are illustrated in FIG. 3. The controller 100 of the periphery monitoring system 10 displays the images which are imaged by the imaging apparatuses 11 to 16 on the monitor 50 as the second image 2B. By doing that, an operator of the dump truck 1 is able to view a situation in the periphery of the dump truck 1. In the example illustrated in FIG. 9, the second image 2B displays an image which is imaged by the imaging apparatus 11 (first imaging apparatus 11) which is illustrated in FIG. 4. Since the first imaging apparatus 11 images the front side of the dump truck 1, the second image 2B displays the first region 11C which is illustrated in FIG. 5. In this example, a part of the dump truck 1 is displayed at the lower part of the second image 2B, that is, on the lower side of the monitor 50.

According to the embodiment, the display control unit 140 displays the dotted lines RL1, R12, and RL3 which are denoted in the first image 2A in the second image 2B. These mutual relationships, and a relationship with the dump truck 1 are the same as those which are described above. In addition, the display control unit 140 displays a dotted line RL0 on the dump truck 1 side rather than the dotted line RL1. The dotted line RL0 denotes the outer edge when the dump truck 1 is perpendicularly projected onto the ground. The dotted line RL0 is also denoted in the first image 2A, however, it is omitted in descriptions in the embodiment. An operator of the dump truck 1 is able to grasp a distance between an object corresponding to the mark MK which is displayed on the first image 2A and the dump truck 1 by the dotted line RL0, the dotted line RL1, the dotted line RL2, and the dotted line RL3.

In the example which is illustrated in FIG. 9, in the monitor 50, a plurality of (three in this example) icons 2C, ICa, and ICb are displayed on the upper side of the second image 2B. Since the second image 2B is arranged on the right side of the monitor 50, and the first image 2A is arranged on the left side, the three icons 2C, ICa, and ICb are arranged on the upper right of the monitor 50. The icon 2C is one of patterns which are displayed by the display control unit 140. The icon 2C denotes a direction in which the imaging apparatuses 11 to 16 are imaging, when the display control unit 140 displays images which are imaged by the imaging apparatuses 11 to 16 on the monitor 50. The icon 2C is displayed on the monitor 50 along with the images which are imaged by the imaging apparatuses 11 to 16, that is, the second image 2B. In the example which is illustrated in FIG. 9, since the second image 2B is an image on the front side of the dump truck 1 which is imaged by the first imaging apparatus 11, that is, the image of the first region 11C which is illustrated in FIG. 5, the icon 2C displays a portion corresponding to the first region 11C as the front side of the dump truck 1 (hatched portion in FIG. 9) to be different from other portions. By doing that, an operator of the dump truck 1 is able to rapidly and reliably recognize which portion in the periphery of the dump truck 1 is displayed by the second image 2B.

The icon ICa which is displayed by the display control unit 140 on the monitor 50 denotes operation states of the plurality of radar units 21 to 28. The icon ICa which is illustrated in FIG. 9 is one of the pieces of system information, and denotes a state in which the plurality of radar units 21 to 28 are in operation states (ON states), and a state in which an object in the periphery of the dump truck 1 can be, detected. The icon ICb is one of the pieces of system information, and denotes a state in which a warning (for example, warning sound) which is presented when the plurality of radar units 21 to 28 detect an object in the periphery of the dump truck 1 is stopped due to an intention of an operator of the dump truck 1. For example, there is a case in which a useless warning sound is harsh for an operator in a place in which a material body as an object to be detected is not reliably present in the periphery of the dump truck 1. At this time, an operation signal is generated when the operator operates a predetermined switch (not illustrated), a warning control unit (not illustrated) which receives the operation signal performs control so as not to sound the warning sound, and outputs a command of displaying the icon ICb to the pattern display control unit 150. When the icon ICb is displayed on the monitor 50, for example, the warning sound is not presented even when an object is detected. At this time, the warning control unit which is not illustrated may control so that the mark MK in the first image 2A is not displayed. By displaying the icons Ica and ICb on the monitor 50, the operator of the dump truck 1 can grasp what a state of the periphery monitoring system 10 is.

According to the embodiment, when a traveling mode of the dump truck 1 is switched into reverse, as illustrated in FIG. 10, only the second image 2B is displayed on the monitor 50. At this time, the second image 2B displays an image which is imaged by the imaging apparatus 16 (sixth imaging apparatus 16) which is illustrated in FIG. 4. Since the sixth imaging apparatus 16 images the rear side of the dump truck 1, the second image 2B displays the sixth region 16C which is illustrated in FIG. 5. As described above, in the second image 2B, the dotted line RL0, RL1, RL2, and RL3 are displayed. In addition, the display control unit 140 displays the dotted line RL0 on the dump truck 1 side rather than the dotted line RL1. The dotted line RL0 denotes the outer edge when the dump truck 1 is perpendicularly projected onto the ground. In the example, the second image 2B displays an image in which the rear side of the dump truck 1 is imaged by the sixth imaging apparatus 16, and the dotted line RL0 denotes the outer edge when the rear end of the vessel 4 (refer to FIGS. 1 and 4) is perpendicularly projected onto the ground. In this example, a part of the vehicle main body 2 of the dump truck 1 is also displayed on the lower part of the second image 2B, that is, on the lower side on the screen of the monitor 50. In addition, a part of the vessel 4 of the dump truck 1 is also displayed on the upper part of the second image 2B. Further, in this example, a vehicle 9 which is present on the left rear side of the dump truck 1 is also displayed in the second image 2B. The vehicle 9 is an object corresponding to the mark MK which is denoted in the first image 2A of FIG. 2.

The shift lever 37 is operated by an operator of the dump truck 1, the sensor 37S which detects a position of the shift lever 37 detects that a travelling mode of the dump truck 1 is shifted into reverse, and a detection signal (display switching signal) thereof is transmitted to the display control unit 140. The display control unit 140 which has received the display switching signal displays only the second image 2B which denotes the rear side of the dump truck 1 on the monitor 50. By doing that, since the periphery monitoring system 10 is able to display an image on the rear side which is the direction to which an operator should pay attention when the dump truck 1 is backed up hereinafter, on the monitor 50, the operator is able to easily grasp a situation in the direction to which the dump truck is going to travelling.

In addition, the operator of the dump truck 1 is also able to switch to an independent display in which only the second image 2B is independently displayed on the monitor 50 (second display mode) from a plurality of displays in which the first image 2A and the second image 2B are displayed (first display mode, and display of two images in this example) on the monitor 50. In this case, the operator operates the screen switching switch 53 which is illustrated in FIG. 3, and causes only the second image 2B to be displayed on the monitor 50. By doing that, the operator is able to display portions which they want to view with attention. The screen switching switch 53 may switch a plurality of displays and a single display of an image which is displayed on the monitor 50 alternately, in each operation. In addition, the screen switching switch 53 may display the respective images which are imaged by the imaging apparatuses 11 to 16 by performing switching in order in each operation, after performing switching to the second image 2B, that is, the single display of the image which is imaged by at least one of the imaging apparatuses 11 to 16 from the plurality of displays, and finally returns to the plurality of displays.

As illustrated in FIG. 10, the second image 2B which is independently displayed on the monitor 50 has a wide area in the monitor 50 compared to a state of the plurality of displays in which both the first image 2A and the second image 2B are displayed on the monitor 50. For this reason, an operator of the dump truck 1 can easily and clearly confirm a situation and an object in the periphery of the dump truck 1 by viewing. According to the embodiment, an aspect ratio of an imaging element, or the number of pixels in lengthwise and breadthwise of the first imaging apparatuses 11 is different from the aspect ratio, or the number of pixels in lengthwise and breadthwise of the monitor 50. For this reason, when the second image 2B is independently displayed on the monitor 50, a non-display region DS in which the second image 2B is not displayed is generated on the monitor 50. According to the embodiment, the display control unit 140 arranges the second image 2B on the left side of the monitor 50, that is, close to the driver's seat 31 which is illustrated in FIG. 3 when independently displaying the second image 2B, and arranges the non-display region DS on the right side of the monitor 50. In this manner, when independently displaying the second image 2B on the monitor 50, the second image 2B is displayed on the driver's seat 31 side of the monitor 50. As a result, an operator of the dump truck 1 can easily view the second image 2B.

In addition, in this example, when a display is switched to the independent display of the second image 2B, since the second image 2B denotes the sixth region 16C as the rear side of the dump truck 1, the icon 2C displays a portion corresponding to the sixth region 16C (hatched portion in FIG. 10) differently from other portions. Subsequently, a display of the monitor 50 when a certain malfunction occurs in the periphery monitoring system 10 will be described. According to the embodiment, the lower part of the dump truck 1 is used with the meaning including a place which is close to the dump truck 1, and the lower part of the rear end of the vessel 4.

Figure 12:
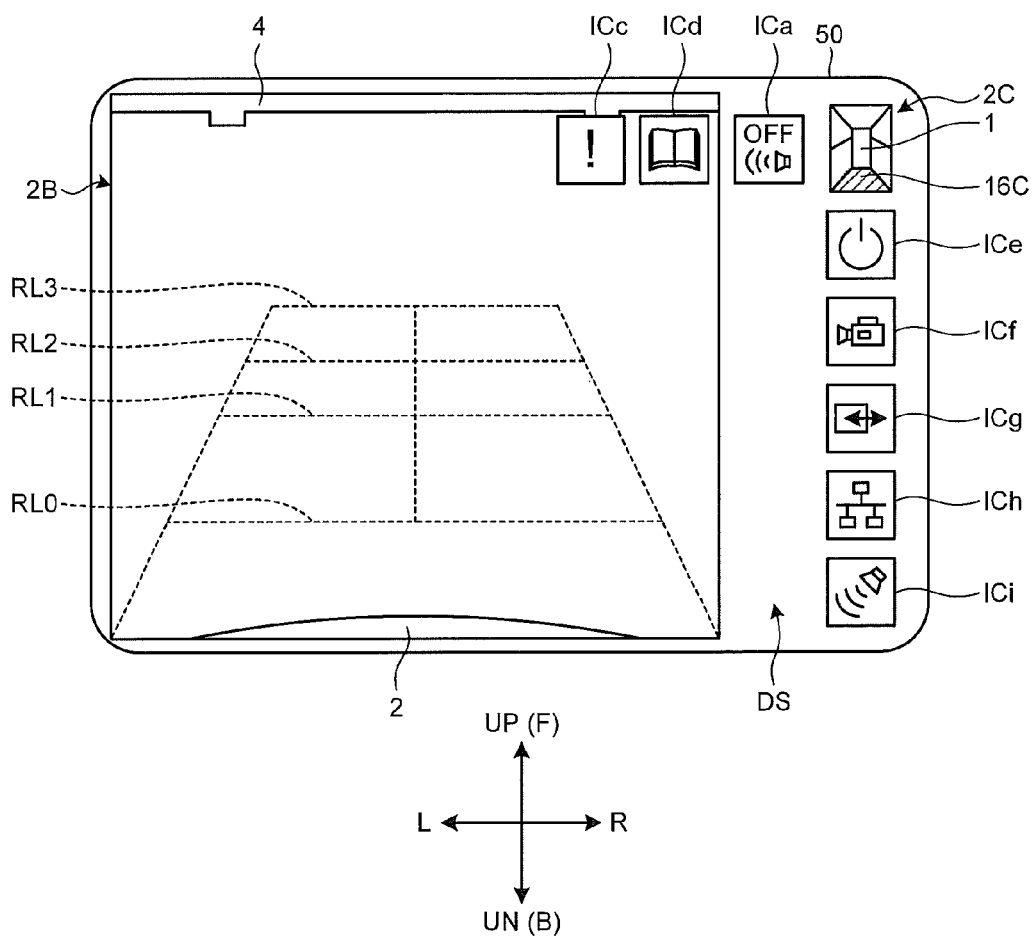
FIG. 12 is a diagram which illustrates the monitor 50 on which only the second image 2B is displayed when a malfunction occurs in the periphery monitoring system 10.

FIG. 11 is a diagram which illustrates the monitor 50 on which the first image 2A and the second image 2B are displayed (plurality of displays) when a malfunction has occurred in the periphery monitoring system 10. FIG. 12 is a diagram which illustrates the monitor 50 in which only the second image 2B is displayed (single display) when a malfunction has occurred in the periphery monitoring system 10. When a certain malfunction has occurred in the periphery monitoring system 10, in addition to the icons 2C, Ica, an icon ICc indicating that a malfunction has occurred, an icon ICd which urges an operator (service person when performing inspection work of dump truck 1) to read a manual such as an instruction manual of the periphery monitoring system 10, and icons ICe, ICf, ICg, ICh, and ICi indicating portions at which a malfunction occurs are displayed on the monitor 50. The icon ICd is one of pieces of system information. Here, when the icon ICd as one of pieces of system information is displayed, if a predetermined switch (not illustrated) is operated, the display control unit 140 may cause information relating to the malfunction which has occurred at the point of time (information describing a cause of the malfunction, or ways of coping with the malfunction) to be displayed on the monitor 50 by being read out from a storage unit which is not illustrated. The icons 2C, ICa, ICc, and ICd are displayed between the first image 2A and the right end of the monitor 50 (upper right) as the upper side of the monitor 50. The pieces of system information such as the icons ICe, ICf, ICg, ICh, and ICi are displayed between the first image 2A and the right end of the monitor 50 (lower right) as the lower side of a screen of the monitor 50.

It is preferable that each icon (ICa, ICb, ICc, ICd, ICe, ICf, ICg, ICh, and ICi) be configured as a pattern, or in color so that it is possible to intuitively understand what each icon means when an operator, or a service person views the pattern of each icon. For example, the icon ICd expresses a thing which brings to mind a book, and brings to mind reading a manual in the pattern, the icon ICf expresses a thing which brings to mind a camera as the imaging apparatuses 11 to 16, and brings to mind a possibility that the camera is broken, or the like, in the pattern, and color of the icon ICf is set to color such as yellow, or red so as to conjure up an image of a breakdown.

The icon ICc indicating that a malfunction occurs has the highest degree of importance in the system information corresponding thereto. Accordingly, the display control unit 140 displays the icon ICc in the closest position to the driver's seat 31 on the monitor 50. As described above, since the icon ICd implies that the icon urges an operator (service person at time of inspection work, or the like) to read a manual, system information corresponding thereto has a high degree of importance. For this reason, the display control unit 140 displays the icon ICd at a position in the monitor 50 which is close to the driver's seat 31 subsequent to the icon ICc. In this manner, according to the embodiment, when the plurality of icons are present, the display positions of these are determined based on the degree of importance of system information corresponding to the plurality of icons. According to the embodiment, a display position is determined so that the degree of importance becomes high in an order which is close to the driver's seat 31 of the dump truck 1. By doing that, an operator of the dump truck 1 can easily recognize important system information. In other words, when an icon which is highly important is displayed at a position which is close to the driver's seat 31, that is, a position which can be easily viewed by an operator, it is possible to suppress an oversight or a misinterpretation of the icon.

As described above, the icon ICd may function as a switch when reading out a manual of the periphery monitoring system 10 which is included in the controller 100 which is illustrated in FIG. 3, and is stored in a storage unit which is not illustrated. That is, when a touch panel is used in the monitor 50, if an operator of the dump truck 1 touches a display position of the icon ICd, the controller 100 which is illustrated in FIG. 3 reads out the manual which is stored in its own storage unit, and displays the manual on the monitor 50.

The icon ICe denotes a situation in which a malfunction occurs in the whole periphery monitoring system 10. The icon ICf denotes a situation in which a malfunction occurs in at least one of the plurality of imaging apparatuses 11 to 16. The icon ICg denotes a situation in which a malfunction occurs in an input-output interface between the controller 100 and the imaging apparatuses 11 to 16, the monitor 50, the radar units 21 to 28, or the like. The icon ICh denotes a situation in which a malfunction occurs in a communication system between the controller 100 and the monitor 50, or in a communication system between the periphery monitoring system 10 and another control device. The icon ICi denotes a situation in which a malfunction occurs in at least one of the plurality of radar units 21 to 28 (for example, breakdown of not radiating radar, or the like). When using a touch panel in the monitor 50, if an operator of the dump truck 1 touches the display position of the icons ICe, ICf, ICg, ICh, and ICi, the controller 100 may causes the monitor 50 to display further detailed information regarding the malfunction, for example, information for specifying a type of the malfunction, an imaging apparatus in which a malfunction has occurred, and the like. In addition, in the example, a situation in which a malfunction has occurred in at least one of the radar units 21 to 28 is denoted, by displaying the icon ICi. For this reason, the icon ICa denotes a state in which the plurality of radar units 21 to 28 are non-operating state (OFF state), and an object in the periphery of the dump truck 1 cannot be detected.

As illustrated in FIGS. 9 and 11, the icon ICa is displayed by being changed in pattern in order to show an operator the operating, or non-operating state of the plurality of radar units 21 to 28 which is expressed by being separated.

However, even when the plurality of radar units 21 to 28 are in the operating state, or the non-operating state, the icon ICa may be displayed using the same pattern. In this case, it is possible to express the operating state, or the non-operating state by separating from each other such that when the plurality of radar units 21 to 28 are in the operating state (ON state), the icon ICa is displayed on the monitor 50 using high brightness, and when at least one of the plurality of radar units 21 to 28 is in the non-operating state (OFF state), the icon ICa is displayed on the monitor 50 using low brightness. Importance of the display positions of the plurality of icons ICe to ICi becomes high in order which is close to the driver's seat 31 of the dump truck 1 based on the degree of importance of the system information. By doing that, an operator, of the dump truck 1 can easily recognize important system information. That is, when an icon which is highly important is displayed at a position which is close to the driver's seat 31, that is, a position which is easily viewed by an operator, it is possible to suppress oversight and misinterpretation of the icon.

The icons ICc, ICe, or the like, indicating that a malfunction has occurred in the periphery monitoring system 10 is displayed on the monitor 50, it is assumed that an operator of the dump truck 1 operates the shift lever 37, and switches a travelling mode to a reverse travel, or the operator operates the screen switching switch 53, and switches a display of the monitor 50 from a plurality of displays to an independent display of the second image 2B. In this case, when the display control unit 140 of the controller 100 obtains a display switching signal from the sensor 37S of the shift lever 37, or the screen switching switch 53, as illustrated in FIG. 12, the second image 2B is independently displayed on the monitor 50. When obtaining a display switching signal, the pattern display control unit 150 displays the icons ICe, ICf, ICg, ICh, and ICi which are displayed on the lower right of the monitor 50 in the plurality of displays, by arranging in one line toward in the vertical direction along the right end of the monitor 50.

The second image 2B is displayed on the whole monitor 50 in the longitudinal (vertical) direction. For this reason, when the icons ICe, ICf, ICg, ICh, and ICi are displayed on the lower side of the screen of the monitor 50, it is difficult for an operator of the dump truck 1 to view the whole second image 2B. In particular, when an operator is driving the dump truck 1, since it is difficult for the operator to view an object of which the height is low directly from the driver's seat 31, or through a side mirror, or the like, it is necessary to pay much more attention to an object which is present on the lower part (ground side) rather than the upper part in the periphery of the dump truck 1, and in the vicinity thereof. For this reason, when the second image 2B in which the periphery of the dump truck 1 is imaged is displayed on the entire monitor 50, it is preferable for the operator to confirm a situation in the periphery of the dump truck 1 when the display positions of the icons ICe, ICf, ICg, ICh, and ICi are moved to the right end from the lower side of the screen of the monitor 50.

According to the embodiment, the pattern display control unit 150 changes the display position of the icons ICe, ICf, ICg, ICh, and ICi based on the display switching signal before and after switching a display of the monitor 50. At this time, the pattern display control unit 150 changes the display position of the icons ICe, ICf, ICg, ICh, and ICi to a position other than the lower side of the screen of the monitor 50. That is, the pattern display control unit 150 changes the display position of the icons ICe, ICf, ICg, ICh, and ICi to a position other than the position corresponding to the lower part of the dump truck 1 which is displayed in the image (second image 2B) which is imaged by at least one of the imaging apparatuses 11 to 16, that is, a position corresponding to the upper part, or the side. By doing that, when the image which is imaged by at least one of the imaging apparatuses 11 to 16 is displayed on the monitor 50 across the longitudinal direction, it is possible to cause the operator to confirm a situation on the lower part (ground side) of the dump truck which is more important, and in the vicinity thereof, when confirming the periphery of the dump truck 1.

According to the embodiment, when a display is switched to an independent display of the second image 2B as the image which is imaged by at least one of the imaging apparatuses 11 to 16, the display position of the icons ICe, ICf, ICg, ICh, and ICi is changed to a position other than the position corresponding to the lower part of the dump truck 1. The change in display position is not limited to such as case, and for example, when a the monitor 50 is switched to a display of the plurality of images including the image which is imaged by at least one of the imaging apparatuses 11 to 16, the display position of the icons ICe, ICf, ICg, ICh, and ICi may be changed to a position other than the position corresponding to the lower part of the dump truck 1. By doing that, it is possible to cause the operator to reliably confirm a situation on the lower part which is more important when confirming the periphery of the dump truck 1.

In this manner, according to the embodiment, when a display of the monitor 50 is switched to an image which is imaged by at least one of the imaging apparatuses 11 to 16, at the time of displaying the icons ICe, ICf, ICg, ICh, and ICi at the position corresponding to the lower part of the dump truck 1 (lower side of screen of monitor 50) which is displayed in the image, it is preferable to change the display position of these to the position other than the position corresponding to the lower part of the dump truck 1. In addition, when being switched to the independent display of the image which is imaged by at least one of the imaging apparatuses 11 to 16, usually, such an image is displayed in the entire region in the longitudinal direction (vertical direction), or in the entire region in the transverse direction (lateral direction) of the monitor 50. Accordingly, when a display of the monitor 50 is switched to the independent display of the image which is imaged by at least one of the imaging apparatuses 11 to 16, if the display position of the icons ICe, ICf, and the like is changed to a position other than the position corresponding to the lower part of the dump truck 1, it is possible to reliably prevent the lower part of the dump truck 1 which is important when confirming the periphery of the dump truck 1 from being hidden by the icons ICe, ICf, ICg, ICh, ICi, or the like.

Since the pattern display control unit 150 changes the display position of the icons ICe, ICf, ICg, ICh, and ICi to the right end of the monitor 50 after a display of the monitor 50 is switched, the display position of the icons ICe, ICf, ICg, ICh, and ICi in the monitor 50 becomes a position which is farther from the driver's seat 31 of the dump truck 1. By doing that, a portion of the second image 2B which is displayed on the driver's seat 31 side, that is, on the side which is close to an operator of the dump truck 1 is not hidden by the icons ICe, ICf, ICg, ICh, and ICi. As a result, it is easy for the operator to confirm a situation in the periphery of the dump truck 1, and an object which are displayed in the second image 2B.

If the aspect ratio, or the number of pixels in lengthwise and breadthwise of the imaging elements which are included in the imaging apparatuses 11 to 16 is different from the aspect ratio, or the number of pixels in lengthwise and breadthwise of the monitor 50, when being switched to the independent display of the second image 2B, a non-display region DS is generated on the monitor 50. In this example, since the non-display region DS is present on the right side of the monitor 50, the pattern display control unit 150 changes the display position of the icons ICe, ICf, ICg, ICh, and ICi to the non-display region DS. In this manner, since it is possible to change the display position of the icons ICe, ICf, ICg, ICh, and ICi to the non-display region DS of the monitor 50, it is possible to effectively use the non-display region DS.

After switching a display of the monitor 50, the pattern display control unit 150 may change the display position of the icons ICe, ICf, ICg, ICh, and ICi to a position other than the lower side of the screen of the monitor 50. For this reason, the pattern display control unit 150 may change the display position of the icons ICe, ICf, ICg, ICh, and ICi to the upper side of the screen of the monitor 50. By doing that, it is also possible for an operator to reliably confirm the situation in the lower part which is more important, in the second image 2B in which the periphery of the dump truck 1 is imaged.

According to the embodiment, the pattern display control unit 150 changes the display position of the icons ICe, ICf, ICg, ICh, and ICi before and after switching a display of the monitor 50, however, the display position of the icons ICc and ICd is maintained. For this reason, the display position of the icons ICc and ICd is displayed at the same position on the monitor 50 before and after switching a display of the monitor 50, and more specifically, close to the upper right side. In this manner, the periphery monitoring system 10 does not change the display position of the icons ICc and ICd which are highly important before and after switching a display of the monitor 50, among the icons 2C, ICa, ICc, and ICd displayed on the monitor 50. This is because the display position of the icons ICc and ICd corresponding to the highly important system information is preferable not to be changed before and after switching a display of the monitor 50. By doing as described above, the periphery monitoring system 10 is able to reduce misrecognition and an operational error when confirming the icons 2C, ICa, ICc, and ICd after switching a display of the monitor 50, or operating the icon ICd in order to read out the manual. In addition, in this example, the display position of the icons 2C and ICa on the monitor 50 is also maintained, and this is because a degree of importance of system information which is denoted by these is high subsequent to the icons ICc and ICd.

According to the embodiment, when obtaining a display switching signal for switching a display of the monitor 50 from the plurality of displays to the independent display, the pattern display control unit 150 changes the display position of the icons ICe, ICf, ICg, ICh, and ICi, however, the switching of display is not limited to the change from the plurality of displays to the independent display. For example, when a display of the monitor 50 is three images, the display position of the icons ICe, ICf, ICg, ICh, and ICi may be changed when the display is switched to a display of two images, or to a display of one image. That is, according to the embodiment, the pattern display control unit 150 may change a display position of icons in the second display mode with respect to a display position in the first display mode when obtaining a display switching signal in which the first display mode for displaying the plurality of displays on the monitor 50 is changed to the second display mode for displaying images smaller than those in the first display mode.

Figure 13:
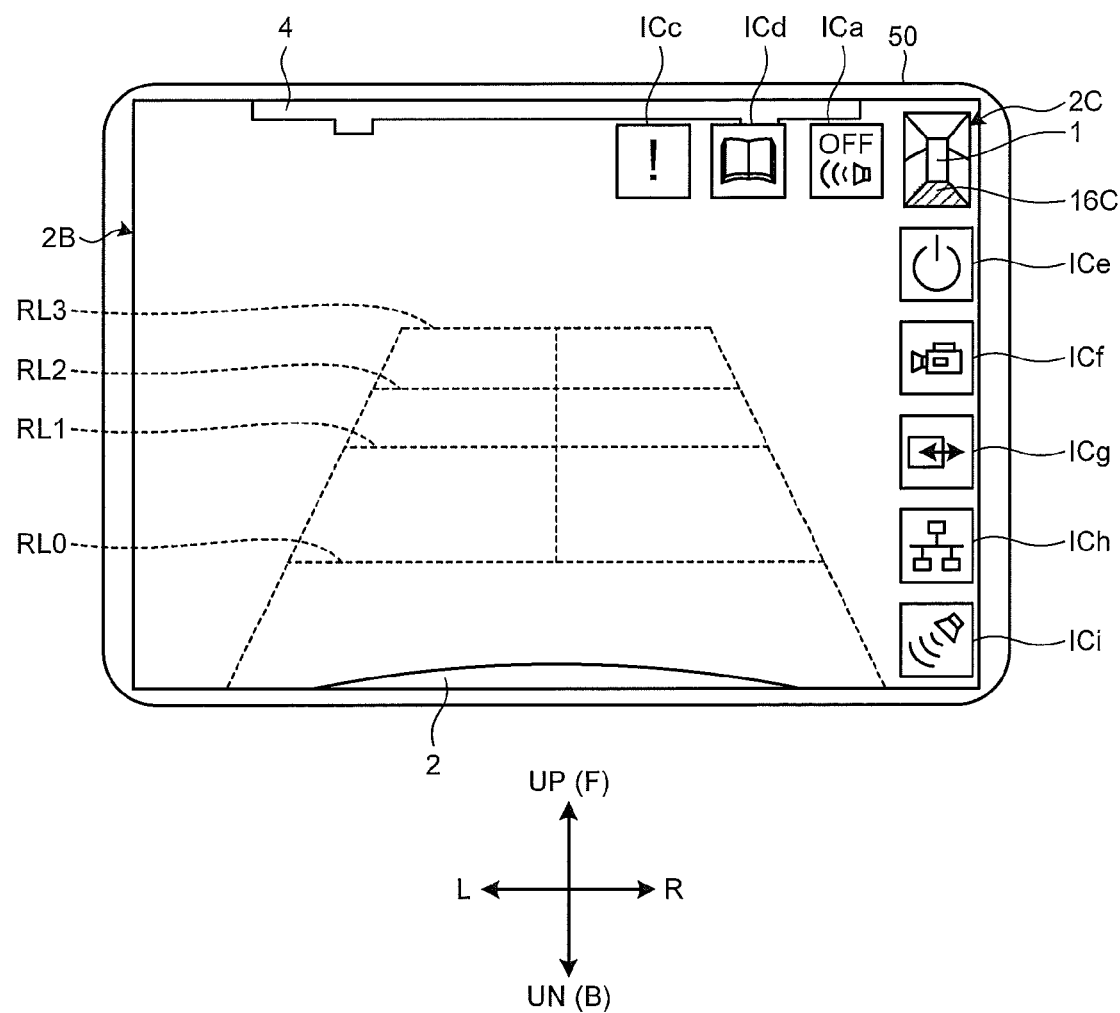
FIG. 13 is a diagram which illustrates another example of the monitor 50 on which only the second image 2B is displayed when a malfunction occurs in the periphery monitoring system 10.

FIG. 13 is a diagram which illustrates another example of the monitor 50 on which only the second image 2B is displayed when a malfunction occurs in the periphery monitoring system 10. In this example, a case is illustrated in which the aspect ratio of the imaging elements in the imaging apparatuses 11 to 16 is the same as that of the monitor 50, or the number of pixels in lengthwise and breadthwise of the imaging elements which are included in the imaging apparatuses 11 to 16 is the same as the aspect ratio of the monitor 50, or the number of pixels in lengthwise and breadthwise. In this case, the second image 2B as the image which is imaged by the imaging apparatuses 11 to 16 is displayed in the whole area of the monitor 50. For this reason, the non-display region DS which is illustrated in FIG. 12 is not included. Even in this case, the pattern display control unit 150 displays the icons ICe, ICf, ICg, ICh, and ICi which are display on the lower side of the screen of the monitor 50 by moving to a position facing downward from above along the right end of the monitor 50 when performing the plurality of displays after switching the plurality of displays of the first image 2A and the second image 2B to the independent display of the second image 2B. In this manner, by changing the display position of the icons ICe, ICf, ICg, ICh, and ICi after the switching of a display of the monitor 50, the icons ICe, ICf, ICg, ICh, and ICi are not displayed on the lower side of the screen of the monitor 50 on which the second image 2B is independently displayed. As a result, even when the second image 2B is displayed in the whole area of the monitor 50 in lengthwise and breadthwise, an operator of the dump truck 1 is able to reliably confirm a situation on the lower part of the dump truck 1 which is more important in the second image 2B in which the periphery of the dump truck 1 is imaged. In addition, even in the example, the display position of the icons which are highly important is not moved.

Figure 14:
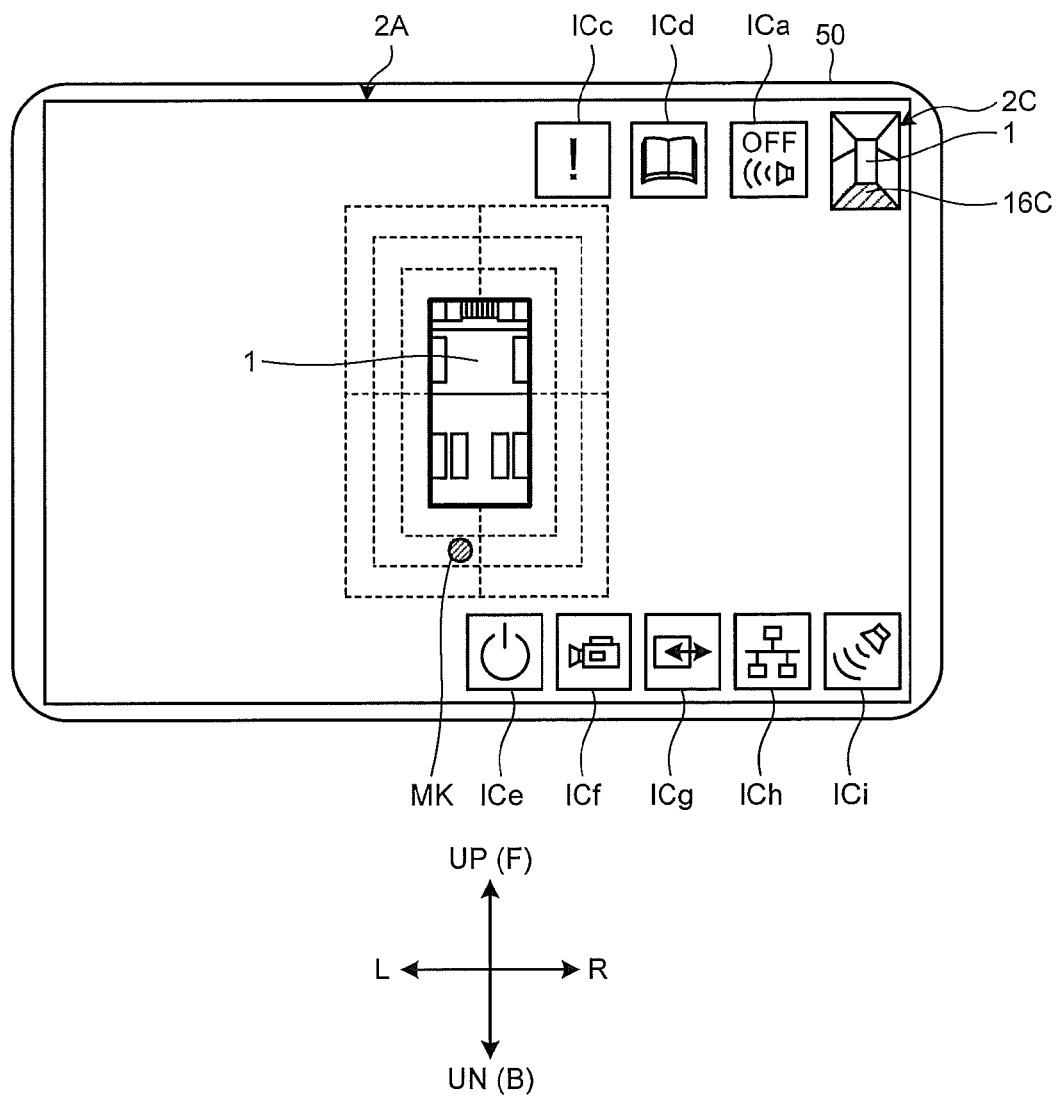
FIG. 14 is a diagram which illustrates another example of the monitor 50 on which the first image 2A and the second image 2B are displayed when a malfunction occurs in the periphery monitoring system 10.
Figure 15:
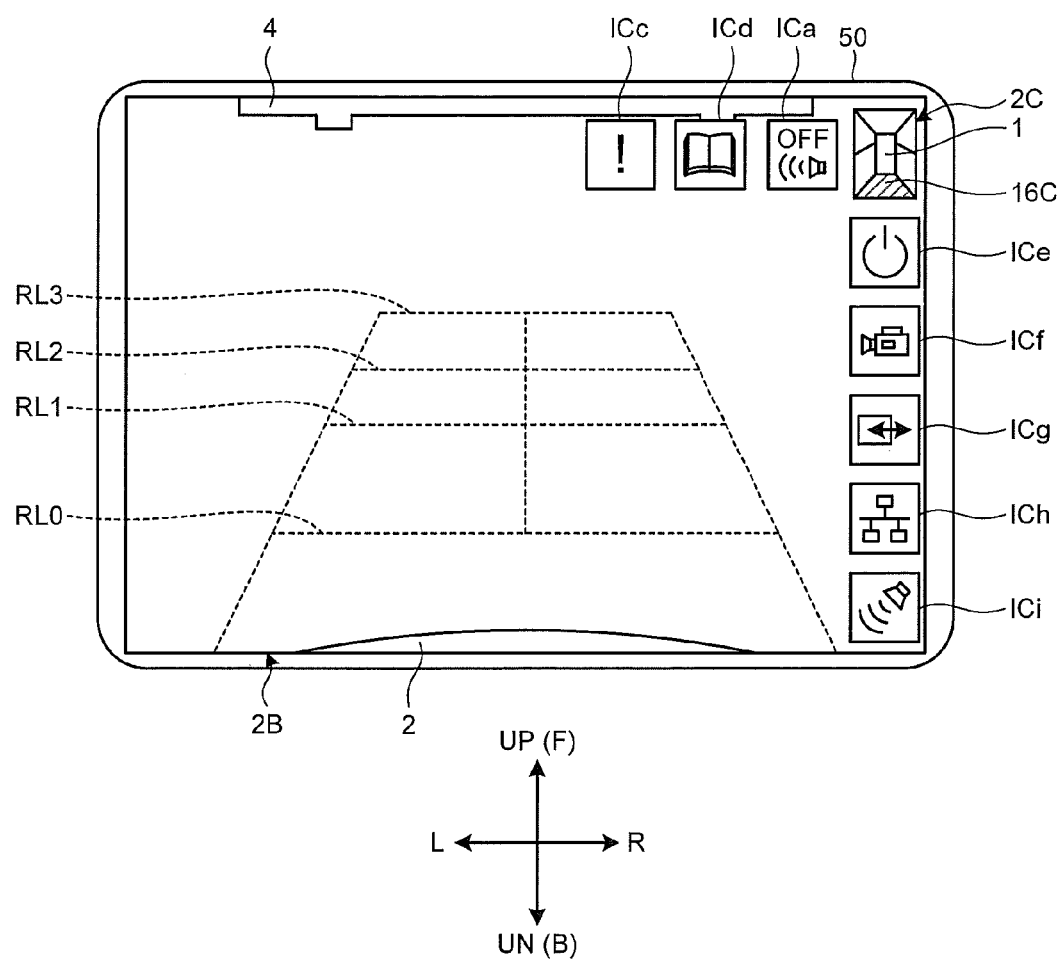
FIG. 15 is a diagram which illustrates another example of the monitor 50 on which only the second image 2B is displayed when a malfunction occurs in the periphery monitoring system 10.

FIG. 14 is a diagram which illustrates another example of the monitor 50 on which the first image 2A and the second image 2B are displayed when a malfunction has occurred in the periphery monitoring system 10. FIG. 15 is a diagram which illustrates another example of the monitor 50 on which only the second image 2B is displayed when a malfunction has occurred in the periphery monitoring system 10. In the example, the display position of icons is changed when a display is switched from an independent display in which only the first image 2A is independently displayed on the monitor 50 to the independent display in which only the second image 2B is independently displayed on the monitor 50.

The first image 2A is an image on which the mark MK corresponding to an object which is present in the periphery of the dump truck 1 is displayed on the bird's eye image 200 which is illustrated in FIG. 5. As illustrated in FIG. 14, in the example, the first image 2A is displayed in the whole area of the monitor 50 in lengthwise and breadthwise. The icons 2C, ICa, ICc, and ICd are displayed on the upper right side of the monitor 50, and the icons ICe, ICf, ICg, ICh, and ICi are displayed toward the right end from the lower center of the screen of the monitor 50. As illustrated in FIG. 15, the second image 2B is displayed in the whole area of the monitor 50 in lengthwise and breadthwise.

When a display of the monitor 50 is switched to the independent display of the second image 2B from the independent display of the first image 2A, the pattern display control unit 150 displays the icons ICe, ICf, ICg, ICh, and ICi which are displayed on the lower side of the screen of the monitor 50 by moving the icons to a position facing downward from above along the right end of the monitor 50. In this manner, by changing the display position of the icons ICe, ICf, ICg, ICh, and ICi to the right end of the monitor 50 after switching the display of the monitor 50, it is possible to prevent the lower side of the screen of the monitor 50 in which the second image 2B is independently displayed from being hidden by the icons ICe, ICf, ICg, ICh, and ICi. As a result, an operator of the dump truck 1 is able to reliably confirm a situation on the lower side of the dump truck 1 which is more important in the second image 2B in which the periphery of the dump truck 1 is imaged. In addition, even in the example, the display position of icons which are highly important is not moved.

Figure 16:
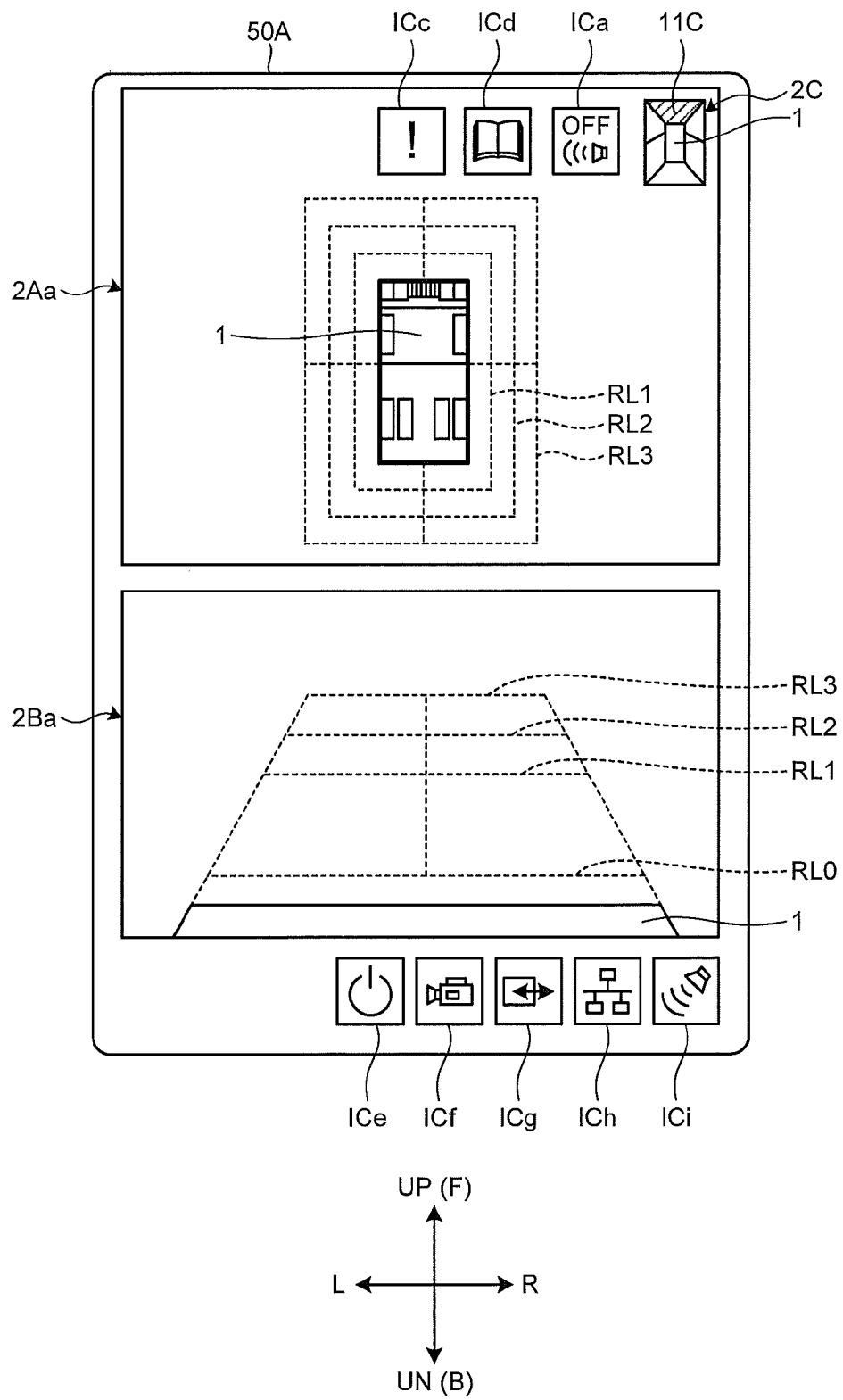
FIG. 16 is a diagram which illustrates another example of the monitor 50 on which the first image 2A and the second image 2B are displayed when a malfunction occurs in the periphery monitoring system 10.

FIG. 16 is a diagram which illustrates another example of the monitor 50 on which the first image 2A and the second image 2B are displayed when a malfunction has occurred in the periphery monitoring system 10. FIG. 17 is a diagram which illustrates another example of the monitor 50 on which only the second image 2B is displayed when a malfunction has occurred in the periphery monitoring system 10. Both the above described examples are cases in which the vertical size of the monitor 50 is smaller than the lateral size thereof, however, in this example, the vertical size of a monitor 50A is larger than the lateral size thereof. Hereinafter, an example will be described in which the display position of icons in a case in which the plurality of displays on which the first image 2A and the second image 2B are displayed on the monitor 50A is switched to the independent display in which only the second image 2B is independently displayed on the monitor 50A is changed. In addition, it is the same as the case in which the independent display in which only the first image 2A is independently displayed on the monitor 50A is switched to the independent display in which only the second image 2B is independently displayed on the monitor 50A.

In this example, the pattern display control unit 150 displays the icons ICe, ICf, ICg, ICh, and ICi which are displayed on the lower side of the screen of the monitor 50A at the time of the plurality of displays by moving the icons to a position facing downward from above along the right end of the monitor 50A after switching to the independent display of the second image 2B from the plurality of displays of the first image 2A and the second image 2B. In this manner, in the example, the display position of the icons ICe, ICf, ICg, ICh, and ICi is also changed to the right end from the lower side of the screen of the monitor 50A, after the display of the monitor 50A is switched. As a result, even when the second image 2B is displayed in the whole area of the monitor 50A in the whole area of the monitor 50A in lengthwise and breadthwise, an operator of the dump truck 1 is able to reliably confirm a situation on the lower side of the dump truck 1 which is more important in the second image 2B in which the periphery of the dump truck 1 is imaged. In addition, even in this example, the display position of icons which are highly important is not moved.

In the above descriptions, the driver's seat 31 is set on the left side of the dump truck 1, however, it may be set on the right side, as well. In this case, a positional relationship of display in right and left between first images 2A and 2Aa and second images 2B and 2Bb, and a positional relationship of display when aligning the icons 2C, ICd, ICc, ICa, and the like in right and left, which are displayed on the monitor 50, are opposite to the above descriptions.

Further, when the display position of the icons ICe, ICf, ICg, ICh, and ICi is changed after the switching of display on the monitor 50A, the size of the display may be changed by maintaining the patterns of each of the icons ICe, ICf, ICg, ICh, and ICi along with a change in the display position, before and after the change in display position. When switching the first images 2A and 2Aa to the second images 2B and 2Bb, the size of a display of each icons ICe, ICf, ICg, ICh, and ICi after switching with respect to the size of a display of each icons ICe, ICf, ICg, ICh, and ICi before switching may be displayed to be small to an extent in which the pattern can be viewed. By doing that, the area of image excepting for the icons is increased, and an operator is able to further easily recognize the situation on the lower part, or the periphery of the dump truck 1.

As described above, according to the embodiment, the periphery monitoring system 10 changes the display position of icons which are displayed on the monitors 50 and 50A after the display of the monitors 50 and 50A is switched, when the display of the monitors 50 and 50A is switched. By doing that, when the display of the monitors 50 and 50A is switched, and an image which is different from the image before switching is displayed on the monitors 50 and 50A in a case in which the icons and another image are displayed on the monitors 50 and 50A at the same time, it is possible to prevent an image at a portion to which an operator of the dump truck 1 should pay attention from being hidden by the icons. As a result, the periphery monitoring system 10 is able to cause an operator to reliably recognize a situation at the portion to which the operator of the dump truck 1 should pay attention.

In addition, the periphery monitoring system 10 changes the display position of the icons when a display of the monitors 50 and 50A is changed to a display of the image which is imaged by at least one of the imaging apparatuses 11 to 16. By doing that, it is possible to prevent an image among the imaged images, and to which an operator of the dump truck 1 should pay attention from being hidden by the icons. As a result, the periphery monitoring system 10 is able to cause an operator to reliably recognize a situation at the portion to which the operator of the dump truck 1 should pay attention. In this manner, the periphery monitoring system 10 can make a situation and an object which are denoted by an image to which an operator should pay attention be easily confirmed, when an image other than the icons is switched to another image, in a case in which the icons as the patterns indicating information, and the image other than the icons are displayed on the monitor 50 at the same time.

In particular, in the periphery monitoring system 10, it is preferable when a ratio of an imaged image which occupies the screen of the monitor 50, or 50A after switching an image becomes large compared to that before switching the image, at the time when a display of the monitor 50, or 50A is switched to the image which is imaged by at least one of the imaging apparatuses 11 to 16. In such a case, since the area in the screen of the monitor 50, or 50A which is occupied by the imaged image becomes large compared to the area before switching, there is a high possibility that the imaged image may be hidden by the icons. Since the periphery monitoring system 10 is able to move the display position of icons after the display of the monitor 50, or 50A is switched to the imaged image, it is possible to prevent the portion to which an operator should pay attention from being hidden by the icons. As a result, the periphery monitoring system 10 enables an operator to easily confirm the portion to which the operator should pay attention, when an image other than the icons is switched to another image.

Hitherto, the embodiments have been described, however, the embodiments are not limited by the content described above. In addition, in the above described constituent elements, things which can be easily conceived by those skilled in the art, and substantially the same things, so-called equivalents in the scope are included. Further, the above described constituent elements can be suitably combined. In addition, various omissions, substitutions, or modifications of the constituent elements can be made without departing from the spirit or scope of the embodiments.

REFERENCE SIGNS LIST

1 DUMP TRUCK MAIN BODY
2a LOWER DECK
2b UPPER DECK
2f FRAME
2, 2Aa FIRST IMAGE
2B, 2Bb SECOND IMAGE
2C, ICa, ICb, ICd, ICe, ICf, ICg, ICh, ICi ICON
3 CAB
4 VESSEL
5 FRONT WHEEL
6 REAR WHEEL
10 WORK VEHICLE PERIPHERY MONITORING SYSTEM (PERIPEHRY MONITORING SYSTEM)
11 to 16 IMAGING APPARATUS
21 to 28 RADAR UNIT
31 DRIVER'S SEAT
37 SHIFT LEVER
37S SENSOR
50, 50A MONITOR
51 CONTROL PANEL
53 SCREEN SWITICHING SWITCH
100 CONTROLLER
110 OVERVIEW IMAGE COMPOSITION UNIT
120 CAMERA IMAGE SWITCHING AND VIWEPOINT CONVERSION UNIT
130 OBJECT POSITION INFORMATION GENERATION UNIT
140 DISPLAY CONTROL UNIT
150 PATTTERN DISPLAY CONTROL UNIT
200 OVERVIEW IMAGE
210 OBJECT INFORMATION COLLECTION UNIT
220 OBJECT PROCESSING UNIT
DS NON-DISPLAY REGION

The invention claimed is:

1. A work vehicle periphery monitoring system which monitors a periphery of a work vehicle, comprising:
an imaging apparatus which is attached to the work vehicle and images a periphery of the work vehicle to output image information;
a display control unit which displays an image based on the image information which is output by the imaging apparatus, and a plurality of patterns indicating information relating to the work vehicle periphery monitoring system on a display unit; and
a pattern display control unit which, when a display of the display unit is switched, changes or maintains display positions of the patterns which are displayed on the display unit after the display of the display unit is switched,
wherein
the display control unit
switches between a first image including a bird's eye image and images including the patterns, and a second image based on the image information imaged by the imaging apparatus to be displayed on the display unit, and
displays at least one of the images including at least one of the patterns included in the first image and the images including the-patterns at positions overlapping the second image, and
when the display of the display unit is switched to the second image, the pattern display control unit changes a display position of at least one of the images including the patterns at the positions overlapping the second image to a position not overlapping the second image, and maintains a display position of another of the images including the patterns at the positions overlapping the second image.

2. The work vehicle periphery monitoring system according to claim 1,
wherein, when the display of the display unit is switched to an image which is imaged by the imaging apparatus, the pattern display control unit changes the display position after the display of the display unit is switched to a position corresponding to an upper side, or a side of the work vehicle which is displayed in the image which is imaged by the imaging apparatus.

3. A work vehicle comprising:
the work vehicle periphery monitoring system according to claim 1.

4. The work vehicle periphery monitoring system according to claim 1, wherein the pattern display control unit changes the display position of the pattern after the display of the display unit is switched to a position which is far from the driver's seat of the work vehicle in the display unit.

5. The work vehicle periphery monitoring system according to claim 1, wherein the display of the display unit is switched based on a signal which is generated by a display switching unit which receives an input for switching the display of the display unit, or a signal indicating a state of the work vehicle.

6. A dump truck periphery monitoring system which monitors a periphery of a dump truck, comprising:
an imaging apparatus which is attached to the dump truck and images a periphery of the dump truck to output image information;
a display control unit which displays an image based on the image information which is output by the imaging apparatus, and a plurality of patterns indicating information relating to the dump truck periphery monitoring system on a display unit; and
a pattern display control unit which, when a display of the display unit is switched, changes display positions of the patterns which are displayed on the display unit after the display of the display unit is switched to a position other than a position corresponding to a lower side of a vessel of the dump truck,
wherein the display positions of the patterns are determined based on a degree of importance of the information corresponding to the patterns,
wherein in the display position, the degree of importance becomes higher in order of proximity to a driver's seat of the dump truck.

7. The dump truck periphery monitoring system according to claim 6, wherein the pattern display control unit maintains the display position of the pattern indicating the information which is highly important, before and after the display of the display unit is switched.

8. The dump truck periphery monitoring system according to claim 6, wherein the pattern display control unit changes the display position of the pattern after the display of the display unit is switched to a position which is far from the driver's seat of the dump truck in the display unit.

9. The dump truck periphery monitoring system according to claim 6, wherein the display of the display unit is switched based on a signal which is generated by a display switching unit which receives an input for switching the display of the display unit, or a signal indicating a state of the dump truck.

10. A dump truck comprising: the dump truck periphery monitoring system according to claim 6.

11. The dump truck periphery monitoring system according to claim 6, wherein, when the display of the display unit is switched to an image which is imaged by the imaging apparatus, the pattern display control unit changes the display position after the display of the display unit is switched to a position corresponding to an upper side, or a side of the dump truck which is displayed in the image which is imaged by the imaging apparatus.

12. A dump truck periphery monitoring system which monitors a periphery of a dump truck, comprising:
    an imaging apparatus which is attached to the dump truck and images a periphery of the dump truck to output image information;
    a display control unit which displays an image based on the image information which is output by the imaging apparatus, and a pattern indicating information relating to the dump truck periphery monitoring system on a display unit; and
    a pattern display control unit which, when a display of the display unit is switched, changes a display position of the pattern which is displayed on the display unit after the display of the display unit is switched to a position other than a position corresponding to a lower side of a vessel of the dump truck,
    wherein the display control unit displays, on the display unit, a pattern indicating an imaging direction of the imaging apparatus as the pattern, with the image which is imaged by the imaging apparatus, and
    wherein the pattern display control unit maintains a position at which the pattern indicating the imaging direction of the imaging apparatus is displayed on the display unit, regardless of a display content of the display unit.

13. A dump truck comprising: the dump truck periphery monitoring system according to claim 12.

14. The dump truck periphery monitoring system according to claim 12, wherein, when the display of the display unit is switched to an image which is imaged by the imaging apparatus, the pattern display control unit changes the display position after the display of the display unit is switched to a position corresponding to an upper side, or a side of the dump truck which is displayed in the image which is imaged by the imaging apparatus.

15. The dump truck periphery monitoring system according to claim 12, wherein, when a plurality of the patterns are present, the display position is determined based on a degree of importance of the information corresponding to the plurality of patterns, and wherein, in the display position, the degree of importance becomes higher in order of proximity to a driver's seat of the dump truck.

16. The dump truck periphery monitoring system according to claim 15, wherein the pattern display control unit maintains the display position of the pattern indicating the information which is highly important, before and after the display of the display unit is switched.

17. The dump truck periphery monitoring system according to claim 12, wherein the pattern display control unit changes the display position of the pattern after the display of the display unit is switched to a position which is far from the driver's seat of the dump truck in the display unit.

18. The dump truck periphery monitoring system according to claim 12, wherein the display of the display unit is switched based on a signal which is generated by a display switching unit which receives an input for switching the display of the display unit, or a signal indicating a state of the dump truck.

19. A dump truck periphery monitoring system which monitors a periphery of a dump truck, comprising:
    a plurality of imaging apparatuses which are attached to the dump truck and image a periphery of the dump truck to output image information;
    a display control unit which displays an image based on the image information which is output by the imaging apparatus, and a pattern indicating information relating to the dump truck periphery monitoring system on a display unit; and
    a pattern display control unit which changes a display position of the pattern which is displayed on the display unit after a display of the display unit is switched to a position other than a position corresponding to a lower side of a vessel of the dump truck based on a display switching signal for switching the display of the display unit,
    wherein, when the display of the display unit is switched to an independent display in which an image which is imaged by the imaging apparatus is independently displayed from a state in which the pattern is displayed at a position corresponding to an area under the dump truck on the display unit, the pattern display control unit changes the display position after the display of the display unit is switched to a position corresponding to an upper side or a side of the dump truck which is displayed in the image which is imaged by the imaging apparatus, and displays the area under the dump truck in the image.

20. A dump truck comprising: the dump truck periphery monitoring system according to claim 19.

* * * * *